United States Patent
Famularo et al.

(10) Patent No.: US 11,315,073 B1
(45) Date of Patent: *Apr. 26, 2022

(54) EVENT ASPECT DETERMINATION

(71) Applicant: Amazon Technologies, Inc., Seattle, WA (US)

(72) Inventors: Jason Michael Famularo, Seattle, WA (US); Amber Autrey Taylor, Seattle, WA (US); Dilip Kumar, Seattle, WA (US); Gianna Lise Puerini, Bellevue, WA (US); Thomas Meilandt Mathiesen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,168

(22) Filed: Jul. 1, 2019

Related U.S. Application Data

(63) Continuation of application No. 14/313,900, filed on Jun. 24, 2014, now Pat. No. 10,339,493.

(51) Int. Cl.
   *G06Q 10/00* (2012.01)
   *G06Q 10/08* (2012.01)
   *G06K 9/00* (2022.01)

(52) U.S. Cl.
   CPC ....... *G06Q 10/087* (2013.01); *G06K 9/00087* (2013.01); *G06K 9/00617* (2013.01)

(58) Field of Classification Search
   None
   See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,175,925 B1 | 5/2012 | Rouaix et al. | |
| 8,189,855 B2 | 5/2012 | Opalach et al. | |
| 8,423,431 B1 | 4/2013 | Rouaix et al. | |
| 8,571,702 B1 * | 10/2013 | Haake | G06Q 10/047 700/213 |
| 8,630,924 B2 | 1/2014 | Groenevelt et al. | |
| 8,688,598 B1 | 4/2014 | Shakes et al. | |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Fateh M Obaid
(74) *Attorney, Agent, or Firm* — Athorus, PLLC

(57) ABSTRACT

Described is a system and method for presenting event information to a user and, if necessary, obtaining confirmation of different aspects (user, item, action) of the event. In some implementations, an event includes a user, an action, and an item. For example, an event may include a user picking an item from an inventory location, a user placing an item into a tote associated with the user, etc. if the aspects of the event cannot be determined with a high enough degree of confidence, a user interface may be generated and sent to the user requesting confirmation of one or more of the aspects of the event.

20 Claims, 15 Drawing Sheets

(56) References Cited

U.S. PATENT DOCUMENTS

| | | |
|---|---|---|
| 9,473,747 B2 | 10/2016 | Kobres et al. |
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0244429 A1* | 8/2014 | Clayton ............. G06Q 30/0631 705/26.7 |
| 2014/0244447 A1* | 8/2014 | Kim ................... G06Q 30/0643 705/27.2 |
| 2014/0244488 A1* | 8/2014 | Kim ..................... G06Q 20/123 705/39 |
| 2014/0279294 A1 | 9/2014 | Field-Darragh et al. |
| 2015/0019391 A1 | 1/2015 | Kumar et al. |
| 2015/0073907 A1 | 3/2015 | Purves et al. |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

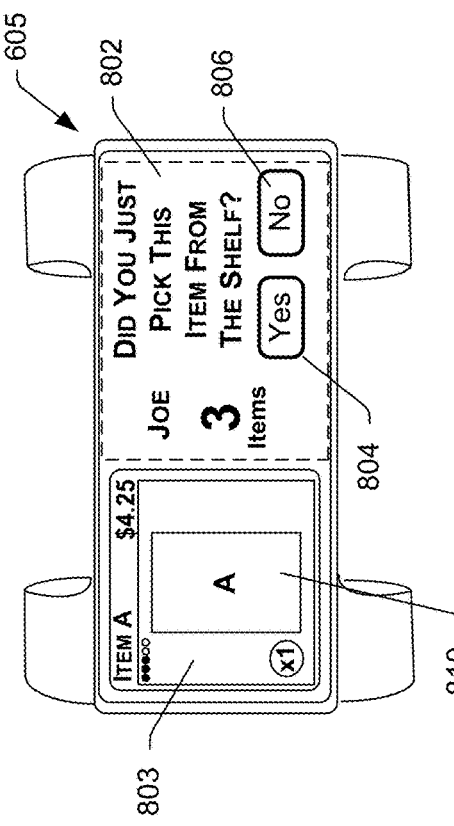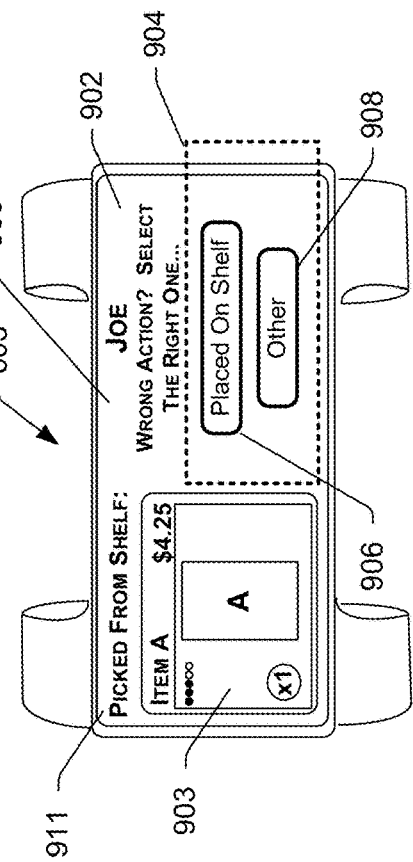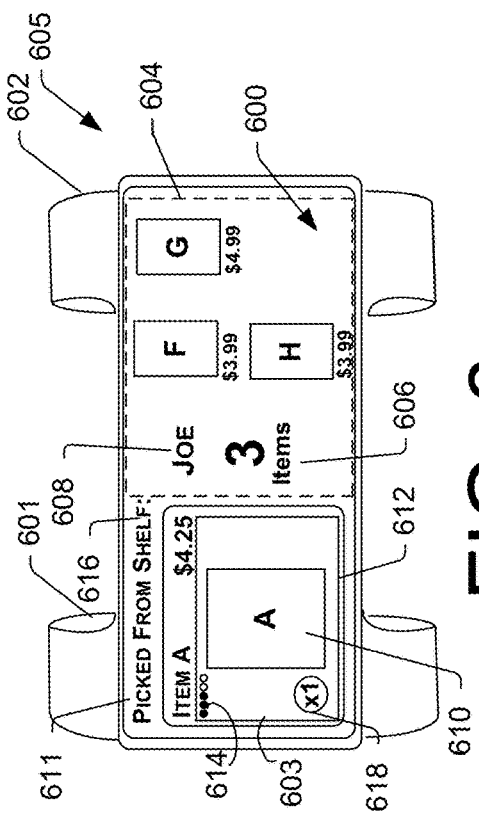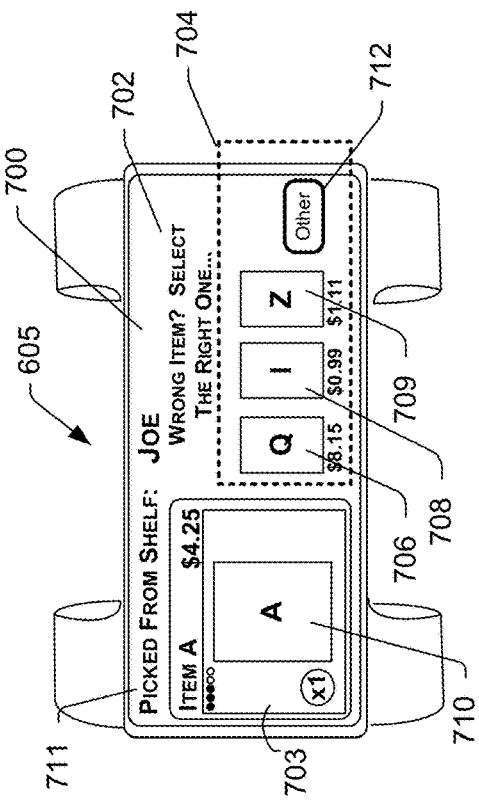
FIG. 8
FIG. 9
FIG. 6
FIG. 7

EVENT ASPECT DETERMINATION

PRIORITY CLAIM

This application is a Continuation of U.S. patent application Ser. No. 14/313,900, filed Jun. 24, 2014, and titled "Associating Users With Totes," the contents of which are incorporated by reference herein in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in an inventory area, or fulfillment center, that can be used to replenish inventory located in the shopping areas and/or to satisfy orders for items that are placed through other channels (e.g., e-commerce). Other examples of entities that maintain inventory include libraries, museums, rental centers, and the like.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 6-12 are block diagrams illustrating different user interfaces generated and sent for presentation to a user, according to one implementation.

Figure 1:
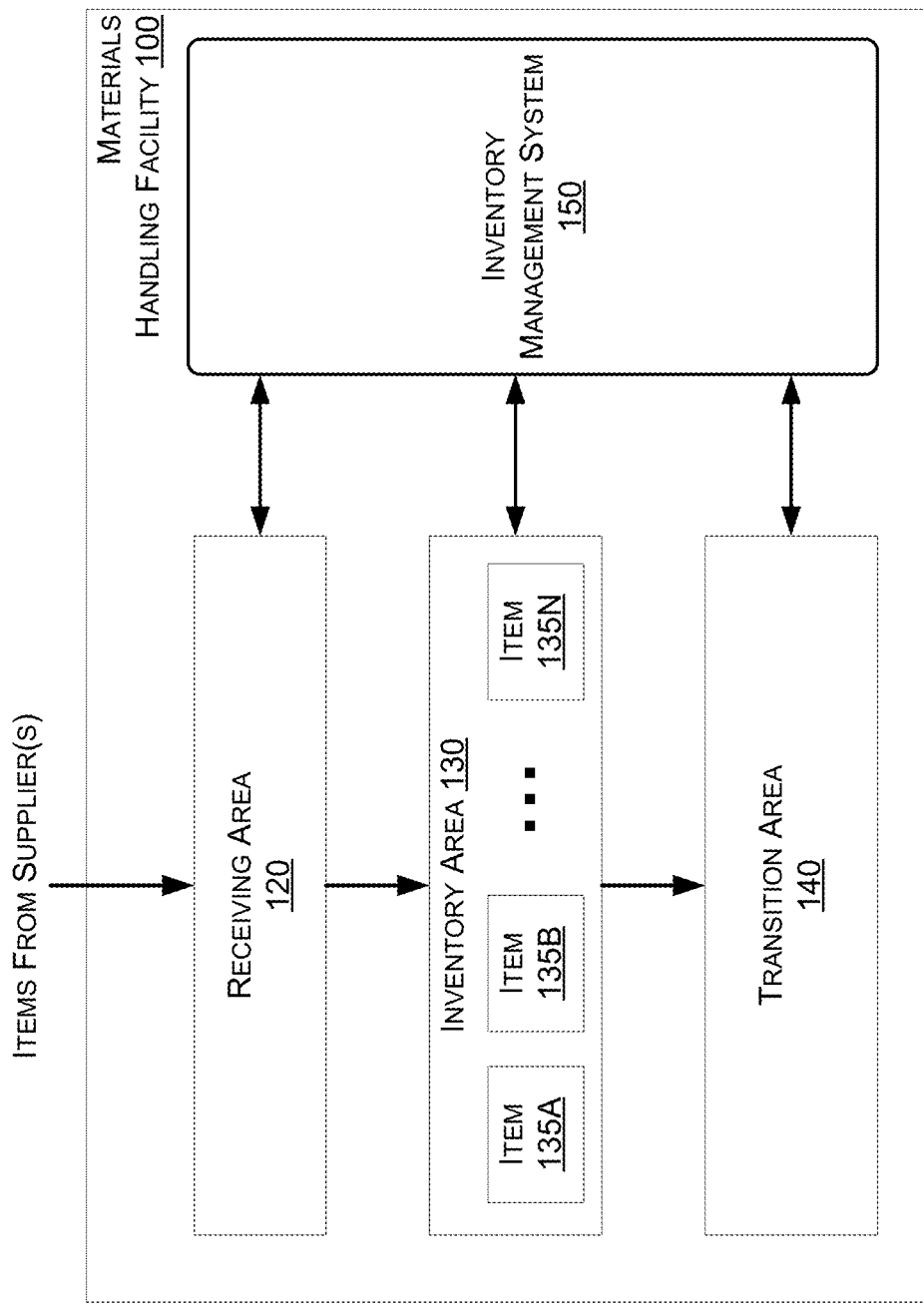
FIG. 1 is a block diagram illustrating a materials handling facility, according to one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system and method for presenting event information to a user and, if necessary, obtaining confirmation of different aspects of the event. In some implementations, an event includes a user, an action, and an item. For example, an event may include a user picking an item from an inventory location, a user placing an item into a tote associated with the user, etc.

Upon the occurrence of each event, each of the user, the item and the action are determined (each an aspect of the event). Based on a confidence that each aspect of the event has been correctly determined, a user interface is generated and sent for presentation to the user. If all aspects are determined with a high degree of confidence, the user interface may simply identify to the user that performed the action, the action performed and the item involved in the action. Such information provides the user with a confirmation that the action performed by the user and the item involved in the action have been properly identified.

However, if one or more of the aspects (user, action, item) are not determined with enough confidence, the user interface may be generated to include a request that the user provide a confirmation of one or more of the aspects of the event. For example, if the user and the action are determined with a high degree of confidence, but the item has not been determined with a high degree of confidence, a user interface may be generated and sent for presentation to the user that requests that the user confirm the identity of the item involved in the event. In some implementations, if the item has been determined to likely be one of a group of items (e.g., two or three items), the user interface may include a representation of each likely item and a request that the user confirm the identity of the actual item involved in the action by selecting one of representations.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances an item may be picked from its inventory area, moved a distance and placed at another location.

Figure 2:
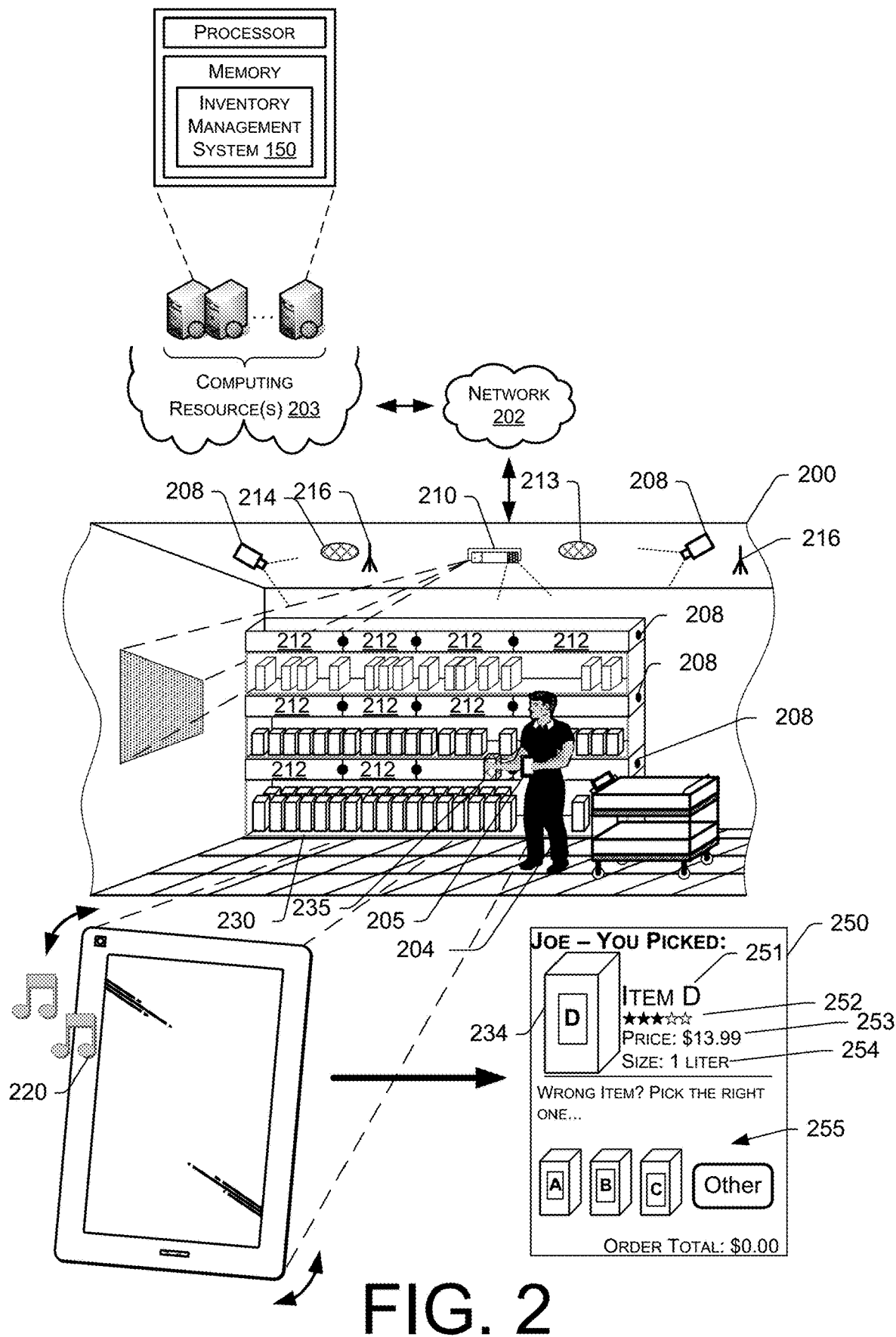
FIG. 2 is a block diagram illustrating additional details of a materials handling facility, according to one implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling to capture images of users and/or locations within the materials handling facility. In addition, in some implementations, one or more cameras 208 may be positioned on or inside of inventory areas. For example, a series of cameras 208 may be positioned on external portions of the inventory areas and positioned to capture images of users and/or the location surrounding the inventory area. Likewise, one or more cameras 208 may be positioned within the inventory areas to capture images of items stored in the inventory areas.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, scales, light curtains, load cells, active tag readers, etc., may be utilized with the implementations described herein. For example, a pressure sensor and/or a scale may be used to detect when an item is added and/or removed from inventory areas. Likewise, a light curtain may be positioned to cover the front of an inventory area and detect when an object (e.g., a user's hand) passes into or out of the inventory area. The light curtain may also include a reader, such as an active tag reader, that can detect a tag included on an item as the item passes into or out of the inventory location. For example, if the item includes an RFID tag (an active tag) a RFID reader (active tag reader) may detect the RFID as the item passes into or out of the inventory location.

When the user 204 arrives at the materials handling facility 200, one or more images of the user 204 may be captured and processed. For example, the images of the user 204 may be processed to identify the user 204. This may be done using a variety of techniques such as facial recognition, pattern matching, etc. In some implementations, rather than or in addition to processing images to identify the user, other techniques may be utilized to identify the user. For example, the user may provide a manual identification (e.g., user name, password), the user may present an identifier (e.g., identification badge, card), an active tag (e.g., RFID tag) in the possession of the user may be detected using an active tag reader, a visual tag in the possession of the user may be detected by, for example, processing an image of the user using an object detection algorithm and/or an edge detection algorithm, biometrics may be utilized to identify the user (e.g., retina scans, fingerprints), a user may provide a manual identification (e.g., user name and password), etc.

The captured images and/or other inputs may also be used to establish a user pattern for the user 204 while located in the materials handling facility 200. The user pattern may identify an overall shape of the user 204 and/or any distinguishing features of the user 204 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200, receive confirmation that the inventory management system 150 has correctly identified items that are picked and/or placed by the user, receive requests for confirmation regarding one or more aspects of an event, etc. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components. Additional details of an example device are discussed below with respect to FIGS. 17-18.

In some instances, the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

A tote 207 may also be associated with the user. The tote may be any form of apparatus configured to hold and/or carry items. For example, the tote 207 may be a bag, cart, trolly, etc. In some implementations, the tote 207 may include a device or display 206, which may be configured in a manner similar to the portable device 205. For example, the display 206 may include a touch-based display, a memory, processor, speakers, wireless network connectivity, etc. In other implementations, the tote 207 may include one or more embedded output devices. For example, the tote 207 may include illumination elements, speakers, actuators, etc. incorporated into the tote that may be activated using the implementations discussed herein.

In some implementations, when the user arrives at the materials handling facility, the user may selected and/or be issued a tote. For example, totes may be dispensed to user's that request a tote. When the tote is dispensed, a tote identifier associated with the dispensed tote is associated with the user profile, thereby associating the tote with the user. In another implementation, the tote may include one or more biometric readers configured to detect biometrics of the user that selected the tote. In such an implementation, the tote may identify the user and provide the user identifier and the tote identifier associated with the tote to the inventory management system. In still another implementation, the totes may include one or more unique visual identifiers and/or active identifiers. When the tote is selected by the user, the identifier is detected (e.g., through image processing of the selected tote and/or detection of the active identifier).

As discussed further below, event information and/or user interfaces may be presented to the user via the portable device 205, the display 206 and/or any other output device located within the materials handling facility 200. Likewise, the portable device 205, the display 206 and/or any other input device located within the materials handling facility may be used to receive input from the user.

Generally, the inventory management system 150 may include one or more input/output devices, such as imaging devices (e.g., cameras) 208, projectors 210, displays 212, speakers 213, microphones 214, illumination elements (e.g., lights), etc., to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items. In some implementations, one or more of the input and/or output devices may be dedicated for specific purposes. For example, some of the displays located throughout the materials handling facility may be dedicated for presenting user specific information (e.g. item identifier lists, recommendations, directions) to users.

Likewise, the inventory management system 150 may also include one or more communication devices, such as wireless antennas 216, that facilitate wireless communication (e.g., Wi-Fi, Near Field Communication (NFC), Bluetooth) between the inventory management system 150 and the portable device 205. The inventory management system 150 may also include one or more computing resource(s) 203, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205, and/or display 206 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202. For example, when the user picks an item 235 from an inventory area 230, the inventory management system 150 may receive information, such as a load cell change, an image of the user, and/or an image of the performed action (item pick from the inventory area), identifying that an item has been picked from the inventory area 230. The aspects of the event (user identity, action performed, item involved in event) may then be determined and the inventory management system 150 may send a user interface and/or information to the portable device 205 for presentation to the user 204. If the inventory management system cannot determine any of the event aspects which a high enough degree of confidence, the user interface sent for presentation to the user may include a request that the user confirm one or more of the aspects. In this example, the user 204 has picked "Item D" from the inventory area 230. Images of the user, the action, the item, and/or other inputs (e.g., weight change at the inventory location) are received and processed to determine each aspect of the event. In this example, the action and the user are determined with a high degree of confidence. However, while it is determined that Item D was likely the picked item, the item identification confidence score is not high enough for the inventory management system 150 to determine that Item D is the picked item. In such an example, a notification alert is sent to the portable device 205 to notify the user 204 that the user interface 250 includes a request for confirmation regarding at least one aspect of an event. In this example, the notification alert is an audible output 220 that is generated by the portable device 205. Likewise, the notification alert may cause an actuator in the portable device 205 to active to provide haptic output to the user, cause the display of the portable device to illuminate, etc.

Continuing with the example, the user interface 250 may present to the user event information, such as the action performed 221. Because the item involved in the event was not determined with enough confidence, the user interface 250 may include an item representation of the item 234 determined to be the most likely item involved in the action and/or item representations of alternative items 255 that may have been involved in the event. The user may select one of the representations to provide a confirmation of the item involved in the event.

While this example illustrates the representation of event related information graphically on the portable device 205, in other implementations, the item information may be provided to other output devices, such as displays 212, display 206, projector 210, speakers 213, etc., and presented to the user 204. In addition to the representation, the user interface 250 may also include additional information about the item, such as the name 251 of the item, the rating 252 of the item, the price 253 of the item, the size 254, the weight of the item, etc. Likewise, rather than the alert 220 and the user interface 250 both being sent to the portable device, the alert may be sent to one device, such as an output device of the materials handling facility to alert the user to look at the display of their portable device. For example, a display 212 may be used to present information to the user notifying the user that they need to look at their portable device 205 to provide confirmation regarding an aspect of an event.

Figure 3:
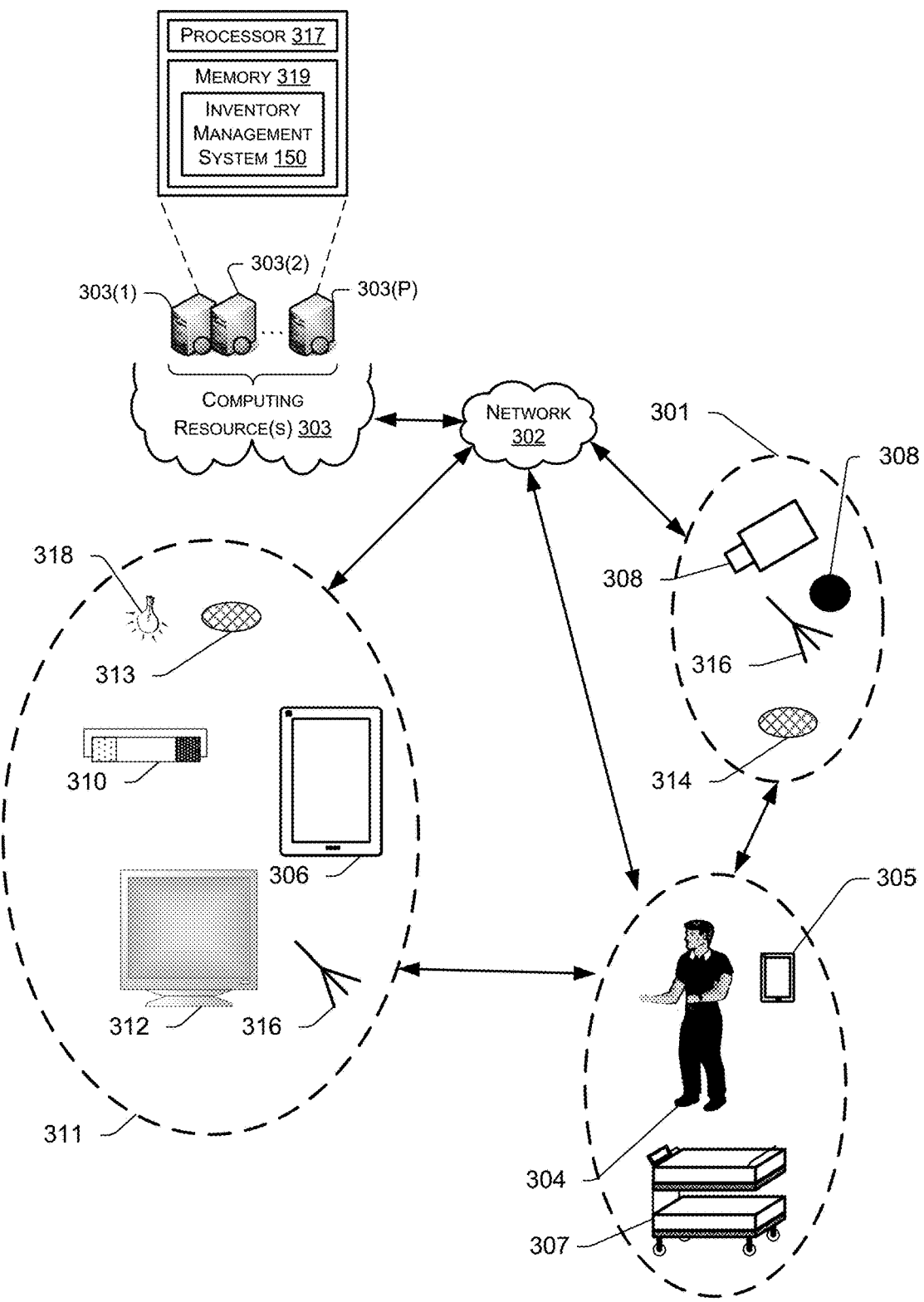
FIG. 3 shows additional components and communication paths between component types utilized in a materials handling facility of FIG. 1, according to one implementation.

FIG. 3 shows additional components and communication paths between component types utilized in a materials handling facility 100, in accordance with one implementation. As discussed above, the portable device 305 may communicate and interact with various components of an inventory management system 150 over a variety of communication paths. Generally, the inventory management system 150 may include input components 301, output components 311 and computing resource(s) 303. The input components 301 may include an imaging device 308, microphone 314, antenna 316, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 303. The computing resource(s) 303 may be local to the environment (e.g., materials handling facility), remote from the environment, or any combination thereof. Likewise, the computing resource(s) 303 may be configured to communicate over a network 302 with input components 301, output components 311 and/or directly with the portable device 305, the user 304 and/or the tote 307.

As illustrated, the computing resource(s) 303 may be remote from the environment and implemented as one or more servers 303(1), 303(2), . . . , 303(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The computing resources 303 may process images of users 304 to identify the user 304, process images of items to identify items, determine a location of items and/or determine a position of items. The computing resource(s) 303 do not require end-user knowledge of the physical location and configuration of the system that delivers the services. Common expressions associated for these remote computing resource(s) 303 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., RF, IR, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4:
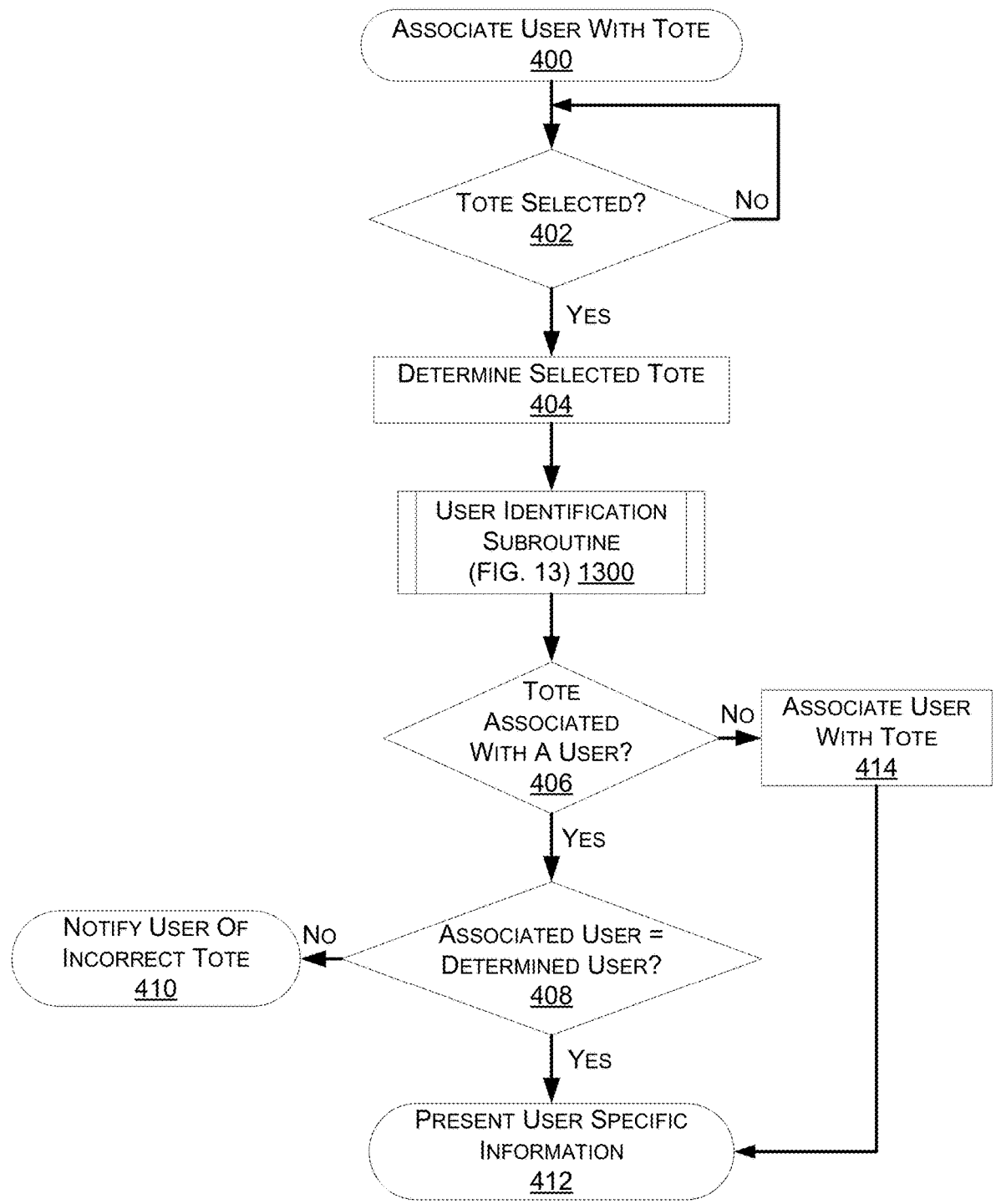
FIG. 4 is a flow diagram of an example routine for associating a tote with a user, according to one implementation.

FIG. 4 is a flow diagram of an example routine 400 for associating a tote with a user, according to one implementation. The example routine of FIG. 4 and each of the other routines discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example routine 400 begins by determining if a user has selected a tote, as in 402. Tote selection may be performed by a user requesting or being issued a tote from an agent of the materials handling facility, a user removing a tote from a tote dispensing mechanism, a user selecting an available tote located within the materials handling facility, etc. Tote selection may occur at any location within a materials handling facility. For example, an initial tote selection and association of a user with a tote may occur when the user enters the materials handling facility. Likewise, each time a user walks away from a tote and then returns to the tote, the return of the user to the tote may be considered a tote selection. For example, a user may be associated a tote, be located in the materials handling facility and walk away from the tote for a period of time to pick an item from an inventory location. When the user returns to the tote, the return of the user to the tote may be considered a tote selection.

If it is determined that the user has not selected a tote, the example routine 400 continues to monitor for a tote selection by a user. However, if it is determined that a user has selected a tote, a tote identifier representative of the tote is determined, as in 404. As discussed above, each tote may have a unique identifier (tote identifier). For example, each tote may include a unique active tag, a visual tag, a processing unit and memory that includes a unique identifier, etc. The tote identifier may be detected by the inventory management system when the user selects the tote. For example, if the tote is being removed from a tote dispensing unit and the tote includes an active tag (e.g., RFID tag), an active tag reader may be positioned at the end of the tote dispensing unit that is configured to detect the active tag as the tote is removed and thereby obtain the tote identifier.

In addition to determining the tote identifier representative of the selected tote, a user identifier representative of the user that selected the tote is determined, as in 1300. The user identifier subroutine 1300 is discussed further below with respect to FIG. 13.

Based on the tote identifier, a determination is made as to whether the selected tote is associated with a user, as in 406. If it is determined that the selected tote is associated with a user, it is determined whether the user associated with the tote corresponds to the user determined to have selected the tote, as in 408. For example, if the tote selection occurs in the middle of the materials handling facility when a user approaches a tote that is already in use and associated with a user, it may be determined whether the user that is approaching the tote is the same user that is associated with the tote. In some implementations, as discussed below, more than one user may be associated with a tote.

If it is determined that the user associated with the tote does not correspond to the user that selected to the tote, the presentation device included on the tote may have any user specific information removed from presentation, as in 410. For example, the presentation device may generally present a user's item identifier list. If the user that selected the tote is determined to not correspond with the user that is associated with the tote, the user's item identifier list may be removed from the presentation device. Likewise, a blank screen, image (e.g., screen saver) and/or visual notification may be presented on the display device alerting the user that selected the tote that they have selected a tote that is currently associated with another user. In some implementations, when a user walks away from a tote, any user specific information may be removed from the display of the tote. In such an implementation, if the tote is later selected by a user that is not associated with the tote, the display may remain blank or present information that the wrong tote has been selected by the user. Information that the wrong tote has been selected by the user may be provided visually, audibly and/or using haptic feedback to notify the user that they have selected a tote that is associated with another user.

If it is determined that the user associated with the tote does correspond with the selected tote, user specific information associated with the user is presented to the user on the display device of the tote, as in 412. The user specific information may include, for example, the user's item identifier list, item recommendations, advertisements, item information that includes a representation of an item picked or placed by the user, action information representative of an action performed by the user, a request that the user confirm an action performed by the user, a request that the user confirm an identity of an item, etc.

Returning to decision block 406, if it is determined that the tote is not currently associated with a user, the tote is associated with the determined user, as in 414. For example, the user identifier and/or user profile of the user may be associated with the tote identifier of the selected tote and maintained by the inventory management system. In some implementations, more than one user (user identifier) may be associated with the same tote. For example, if two users are located in the materials handling facility and are both picking items together for placement into the tote, the user identifiers representative of each user may be associated with the tote. In such an example, either user may pick and/or place items into and/or out of the tote and those items may be identified and a single item identifier list that is presented to either user as user specific information.

Upon associating the tote with the identified user, the example process 400 presents user specific information to the user on the display device of the tote, as in 412. For example, an item identifier list associated with the user, information illustrated and discussed below with respect to FIGS. 6-12, recommendations, advertisements, etc. may be presented to the user on the display of the selected tote.

Figure 5A:
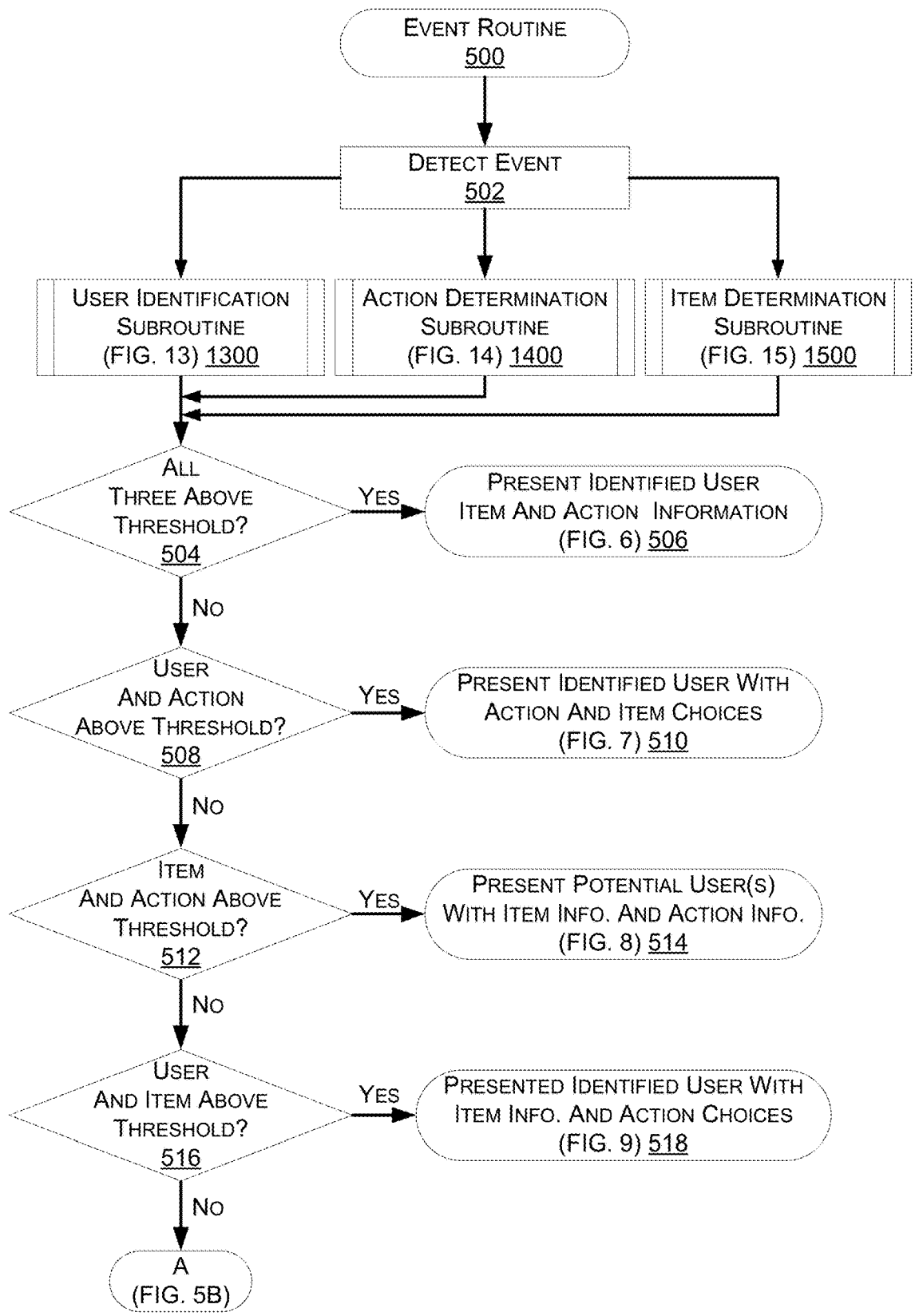
FIGS. 5A-5B is a flow diagram of an example event routine, according to one implementation.
Figure 5B:
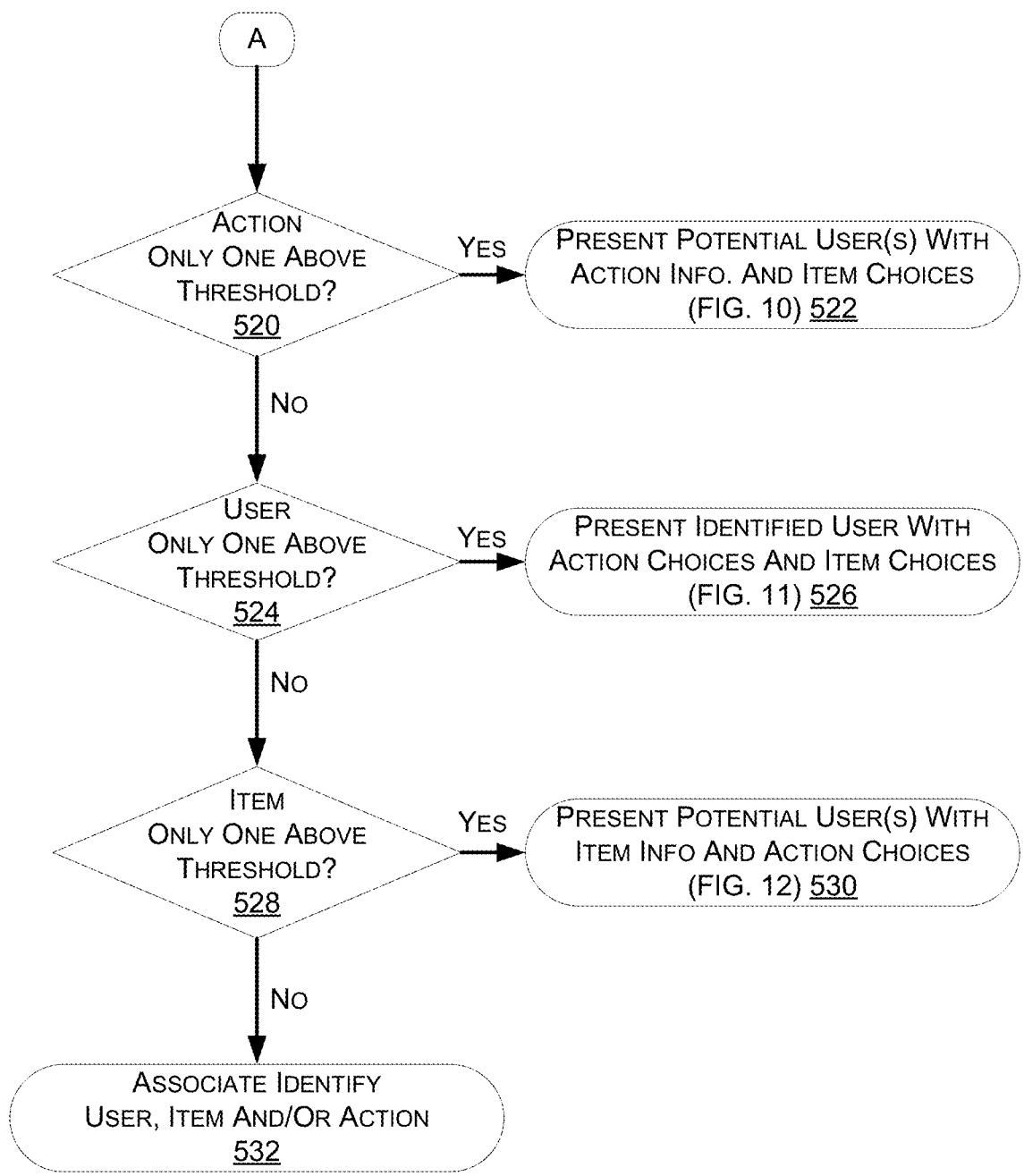

FIGS. 5A-5B is a flow diagram of an example event routine, according to one implementation. The discussion with respect to the example routine 500 includes reference to example user interfaces generated as part of the example routine and are referenced with respect to FIGS. 6-12. The user interfaces illustrated in FIGS. 6-12 are illustrated as being presented on a device 605. The device 605 may include the same or similar components to the portable device. In this example, the device 605 includes a pair of bands 602 or straps that may be used to secure the device 605 to a user's arm, tote, etc. It will be appreciated that while the example user interfaces are illustrated as presented on the device 605, the user interfaces may be sent for presentation on any one or more devices capable of presenting information to a user. For example, the user interface may be presented on a display located within the materials handling facility. Accordingly, the device 605 illustrated in FIGS. 6-12 is merely illustrative.

The example routine 500 begins upon the detection of an event. An event may be an activity within a materials handling facility. For example, an event may include a user picking an item from an inventory location, a user placing an item at an inventory location, a user placing an item into a tote or a user picking an item from a tote. An event may be detected by an inventory management system based on a change to one or more inputs. For example, if a scale, pressure sensor, etc. determines a change in a weight at the inventory location, an event may be detected. Likewise, if an image captured by an image capture device within the materials handling facility is processed and it is determined that an item has been picked from a tote, an event may be determined.

In each event there are three aspects—an action (item pick from an inventory location, item place at an inventory location, item place into a tote, item pick from a tote), a user that performed the event, and an item involved in the event. Upon detection of an event, each of the user identification subroutine 1300 (FIG. 13), action determination subroutine 1400 (FIG. 14), and item determination subroutine 1500 (FIG. 15) are performed. As discussed in further detail below, the user identification subroutine 1300 determines an identity of the user involved in the event and a user identification confidence score representing a confidence that the user has been properly identified. The action determination subroutine 1400 determines the action performed by the user and an action determination confidence score representing a confidence that the action has been properly determined. The item determination subroutine 1500 determines the item involved in the event and an item determination confidence score representing a confidence that the item has been properly determined.

Upon completion of each of the user identification subroutine 1300, the action determination subroutine 1400 and the item determination subroutine 1500, a determination is made as to whether all three of the returned confidence scores exceed a respective threshold, as in 504. For example, the inventory management system may maintain a user identification threshold, an action determination threshold and an item determination threshold each of which must be exceeded by the respective confidence score before the returned result is determined accurate.

The thresholds may be any defined value and the different thresholds may be different or the same values. Likewise, one or more of the thresholds may vary depending on one or more of the item, the action, the user, the time of day, the number of users in the materials handling facility and/or other factors. For example, the user identification threshold may be lower if the user is alone in an aisle with the event is performed. In comparison, if there are multiple users in the aisle, the user identification threshold and/or other thresholds, may be higher because there is a higher potential for error.

If a confidence score exceeds a threshold, it is determined that the corresponding item/user/action has been properly identified. For example, if the item determination confidence score returned with the item identifier exceeds the item determination threshold, it may be determined that the item has been properly identified. However, if the item determination confidence score returned with the item identifier does not exceed the item determination threshold, it may be determined that user verification of the item is to be obtained.

If it is determined that all three of the confidence scores exceed the respective thresholds, a user interface that identifies the determined action and the determined item is generated and sent to a device for presentation to the identified user, as in 506. For example, turning to FIG. 6, illustrated is a user interface 600 that includes item information 603 representative of the item determined to be involved in the event. The item information 603, may include a representation 610 of the determined item, and/or other information about the determined item. The user interface may also identify a quantity 606 of items currently identified on the item identifier list along with the name 608 or other identifier of the user. In this example, three items have been added to the user tote and identified in the item identifier list. Those three items are graphically represented in the item identifier list representation 604.

The item information 603 includes a graphical representation 610 of the item, in this example "Item A" is determined to correspond with the item picked by the user. Additional item information, such as the name 612 of the item, a user or community rating 614 of the item, a price of the item 616, a quantity 618 of the item picked by the user, etc., may also be presented as part of the item information 603. The graphical representation 610 of the item and the additional item information may be maintained by the inventory management system 150 in the inventory data store 1915 (FIG. 19) and provided to the device 605 when an item picked by the user is determined. Item determination is discussed further below with respect to FIG. 15.

The user interface may also provide action information 611 representative of the determined action. For example, the action information 611 "Picked From Shelf" provides a visual confirmation to the user that the action (picking an item from an inventory location) has been properly determined.

Because all three aspects of the event were determined with a high degree of confidence, no user input is needed or requested by the user interface 600.

Returning to FIG. 5A, if it is determined that not all of the confidence scores exceed their respective thresholds, a determination is made as to whether the user identifier confidence score exceeds the user identifier threshold and the action determination confidence score exceeds the action determination threshold, as in 508. If it is determined that the user identifier confidence score exceeds the user identifier threshold and the action determination confidence score exceeds the action determination threshold, and thus, the item determination confidence score does not exceed the item determination threshold, a user interface is generated and sent for presentation to the identified user that identifies the determined action and includes a request that the user confirm the identity of the item involved in the event, as in 510.

For example, referring to FIG. 7, illustrated is a user interface 700 that is sent to a device for presentation to the identified user. The user interface 700 illustrated in FIG. 7 includes action information 711 representative of the determined action. Similar to the above, the action information provides confirmation to the identified user that the action performed was properly determined. However, in this example, because the item was not determined with enough confidence to exceed the item confidence score, one or more potential items are identified in the user interface 700 along with a request that the user confirm the identity of the item involved in the event. In some implementations, the item determined to have the highest correlation (discussed below) may be prominently identified compared to alternative items. For example, the item information 703 is representative of the item returned by the item determination subroutine as having the highest item correlation and is presented more prominently than the alternative item information 704. For example, the representation 710 for the item having the highest correlation may be presented larger than representations for alternative items. The alternative item information 704 may include item information for one or more alternative items determined to have the next highest item determination confidence scores and thus, potentially corresponding to the item involved in the event. For example, representations 706, 708, 709 may be included in the alternative item information 704 to represent items that also may correspond to the item involved in the action.

The user interface 700 may also include a request 702 that the user confirm the identity of the item involved in the action. The user may provide a confirmation by selecting the item information 703, one of the alternative item representations 706, 708, 709 or selecting the "Other" control 712 and provide an identification of the item involved in the event. In some implementations, if the item represented by the item information 703 corresponds to the item involved in the event, the user may select the item by not providing an input or by selecting the representation of the item.

Returning back to FIG. 5A, if it is determined at decision block 508 that the user identification confidence score does not exceed the user identification threshold and/or the action determination confidence score does not exceed the action determination threshold, a determination is made as to whether the item determination confidence score exceeds the item determination threshold and the action determination confidence score exceeds the action determination threshold and thus, the user identification confidence score does not exceed the user identification threshold, as in 512. If it is determined that the item determination confidence score exceeds the item determination threshold and the action determination confidence score exceeds the action determination threshold, a user interface is generated and sent to a device for presentation to a user potentially determined to be involved in the event, as in 514. In some implementations, the user interface may be provided to multiple users, each of which are determined to be potentially involved in the event. If the user interface is sent for presentation to multiple users, when one of the potential users confirm that they were involved in the event, the user interface may be removed from presentation to the other potential users.

Turning to FIG. 8, illustrated is a user interface 800 generated and sent in response to a determination that the item determination confidence score exceeds the item determination threshold and the action determination confidence score exceeds the action determination threshold but the user identification confidence score does not exceed the user identification threshold. As illustrated in the user interface 800, the item information 803 identifies the item determined to be involved in the event, the request 802 confirms the action performed and requests confirmation from the potential user as to whether the user performed the determined action with the determined item. In this example, the request 802 "Did You Just Pick This Item From The Shelf?" provides confirmation of the determined action (picking an item from an inventory location), references the item representation 810 presented on the user interface 800 and requests that the potential user confirm whether they performed the determined action. The user may confirm that they performed the action by selecting the "Yes" control 804 or confirm that they did not perform the action by selecting the "No" control 806.

Similar user interfaces may be presented for other determined actions, with different requests. For example, if the determined action is a place of the determined item at the inventory location, the request may state "Did You Just Place This Item On The Shelf?" If the determined action is a pick of the item from a tote, the request may state "Did You Just Pick This Item From Your Tote?" If the determined action is a place of the item into a tote, the request may state "Did You Just Place This Item Into Your Tote?" In general, the user interface 800 may have any configuration that provides a confirmation of the determined item and the determined action along with a request that the user confirm whether they performed the action.

Potential users may be users determined by the user identification subroutine and potentially being involved in the event. For example, the user identification subroutine may return user information for the three user identifiers having the highest correlation with the processed user image information, as discussed in further detail below.

Returning to FIG. 5A, if it is determined at decision block 512 that the item determination confidence score does not exceed the item determination threshold and/or the action determination confidence score does not exceed the action determination threshold, a determination is made as to whether the user identification confidence score exceeds the user identification threshold and the item determination confidence score exceeds the item determination threshold, as in 516. If it is determined that the user identification confidence score exceeds the user identification threshold and the item determination score exceeds the item determination threshold, a user interface is generated and sent to a device for presentation to the identified user that includes a confirmation of the determined item and a request that the user confirm the performed action, as in 518.

Turning to FIG. 9, illustrated is a user interface 900 generated and sent in response to a determination that the user identification confidence score exceeds the user identification threshold and the item determination confidence score exceeds the item determination threshold but the action determination confidence score does not exceed the action determination threshold. As illustrated in the user interface 900, item information 903 is provided that confirms to the identified user that the item involved in the event has been properly determined. However, because the action was not determined with a high enough degree of confidence, the user interface 900 includes a request 902 that the identified user confirm the performed action. In this example, the request 902 "Wrong Action? Select The Right One . . . " requests that the user confirm the performed action. In some implementations, the action determined by the action determination subroutine to be most likely is represented by the action identifier 911. The user may confirm the most likely action by, for example, providing no input (implicit approval) and or by providing an active confirmation, such as selecting the item or the displayed action. The user may confirm a different action by selecting an alternative action 904, such as the first alternative action 906 "Placed On Shelf" to confirm that the action performed was the user placing the item at an inventory location. Alternatively, the user may select the "Other" control 908 to confirm a different action performed in the event. Alternative actions 904 may represent other actions determined by the action determination subroutine to potentially have been performed as part of the event. For example, the highest probability action may have been an item pick from an inventory location. However, there is a potential that the user was placing the item at the inventory location. In such an example, the action identifier 911 may represent the most likely action of picking the item from the inventory location and the alternative action may be the place of the item at the inventory location.

Returning to FIG. 5A, if it is determined that the user identification confidence score does not exceed the user identification threshold and/or the item determination confidence score does not exceed the item determination threshold, a determination is made as to whether the action determination confidence score is the only confidence score that exceeds a respective threshold, as in 520 (FIG. 5B). If it is determined that the action determination confidence score is the only score that exceeds the respective threshold, a user interface is generated and provided to one or more potential users that confirms the action performed and requests both that the user confirm that they were involved in the event and confirm the item involved in the event, as in 522.

Figure 10:
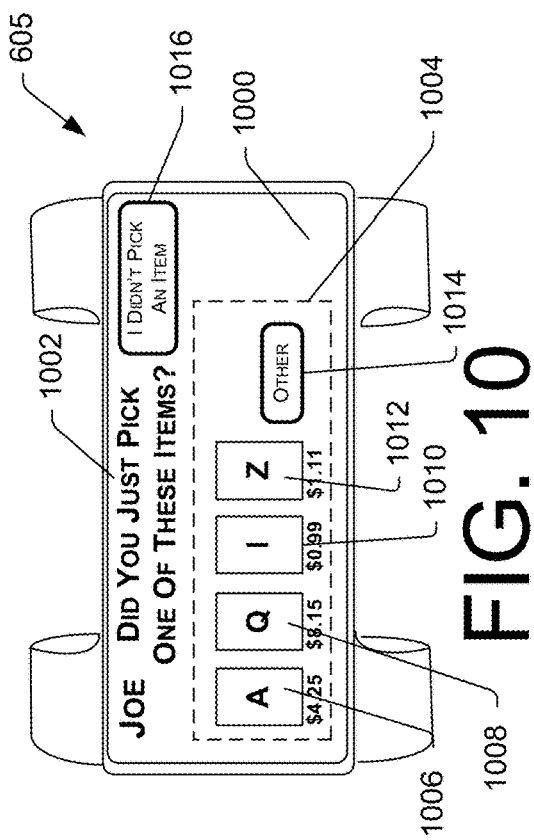

Turning to FIG. 10, illustrated is a user interface 1000 generated and sent for display to one or multiple potential users in response to a determination that the action determination confidence score is the only confidence score that exceeds the respective threshold. As illustrated, the user interface 1000 includes a request that the user confirm whether they performed the determined action and if so, the item involved in the event. In this example, the request 1002 "Did You Just Pick One Of These Items?" includes the confirmation of the determined action. Likewise, the user interface 1000 includes item information representative of one or more items potentially involved in the event. For example, the alternative item information 1004 may include representations 1006, 1008, 1010, 1012 for items determined by the item determination subroutine to potentially be involved in the event. For example, the item determination subroutine may identify multiple items as having a probability of being involved in the event. A potential user may confirm both requests (confirming user involvement/identity and the item involved in the event) by selecting one of the alternative item representations 1006, 1008, 1010, 1012, or by selecting the "Other" control 1014 and confirming the identity of another item involved in the event. Alternatively, a potential user may confirm that they were not involved in the event by selecting the "I Didn't Pick An Item" control 1016.

In some implementations, the user interface 1000 may be generated and sent to multiple potential users. When one of the potential users confirms involvement in the event, the user interface 1000 may be removed from presentation to the other potential users. Potential users may be users identified by the user identification subroutine as potentially involved in the event.

Returning to FIG. 5B, if it is determined that the action determination confidence score does not exceed the action determination threshold, a determination is made as to whether the user identification confidence score is the only confidence score that exceeds a respective threshold, as in 524. If it is determined that the user identification confidence score is the only confidence score that exceeds the respective threshold, a user interface is generated and sent for presentation to the identified user that includes requests that the identified user confirm both the action performed and the item involved in the event.

Figure 11:
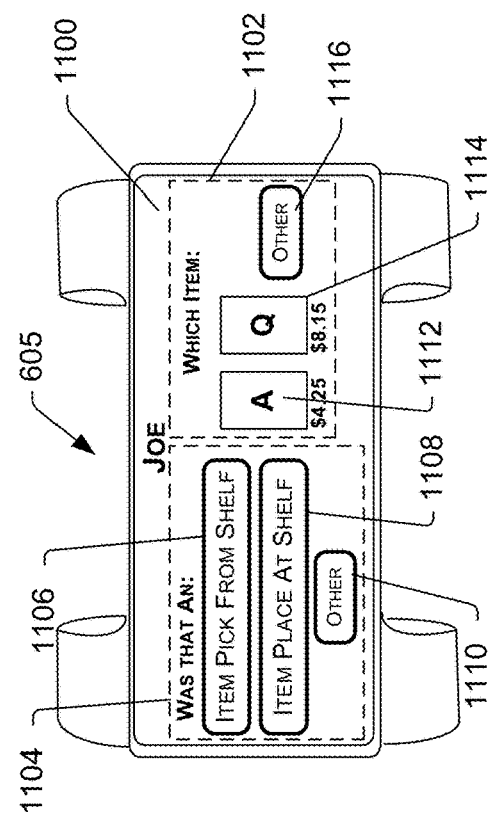

Turning to FIG. 11, illustrated is a user interface 1100 generated and sent for display in response to a determination that the user identification confidence score is the only confidence score that exceeds the respective threshold. As illustrated, the user interface 1100 includes a request that the identified user confirm both the action performed and the item involved in the event. For example, the user interface 1100 may include one or more alternative actions 1104 such as a first alternative action 1106 "Item Pick From Shelf" and a second alternative action 1108 "Item Place At Shelf" that the identified user can select to confirm the action performed. The alternative actions may represent the actions identified by the action determination subroutine as the most likely actions performed in the event. Alternatively, the identified user may select a different action by selecting the "Other" control 1110 and identifying a different action as the action performed as part of the event.

Likewise, the user interface 1100 may include alternative item information 1102 identifying items that were potentially involved in the event. For example, the alternative item information 1102 may include representations 1112, 1114 representative of items determined by the item determination subroutine to be potentially involved in the event. The user may confirm the item involved in the event by selecting one of the representations 1112, 1114 or by selecting the "Other" control 1116 and identifying another item as involved in the event.

Returning to FIG. 5B, if it is determined that the user identification confidence score does not exceed the user identification threshold, a determination is made as to whether the item determination confidence score is the only confidence score that exceeds a respective threshold, as in 528. If it is determined that the item determination confidence score is the only confidence score that exceeds a respective threshold, a user interface is generated and provided to one or more potential users and includes requests that the user confirm involvement in the event and the action performed with respect to the determined item.

Figure 12:
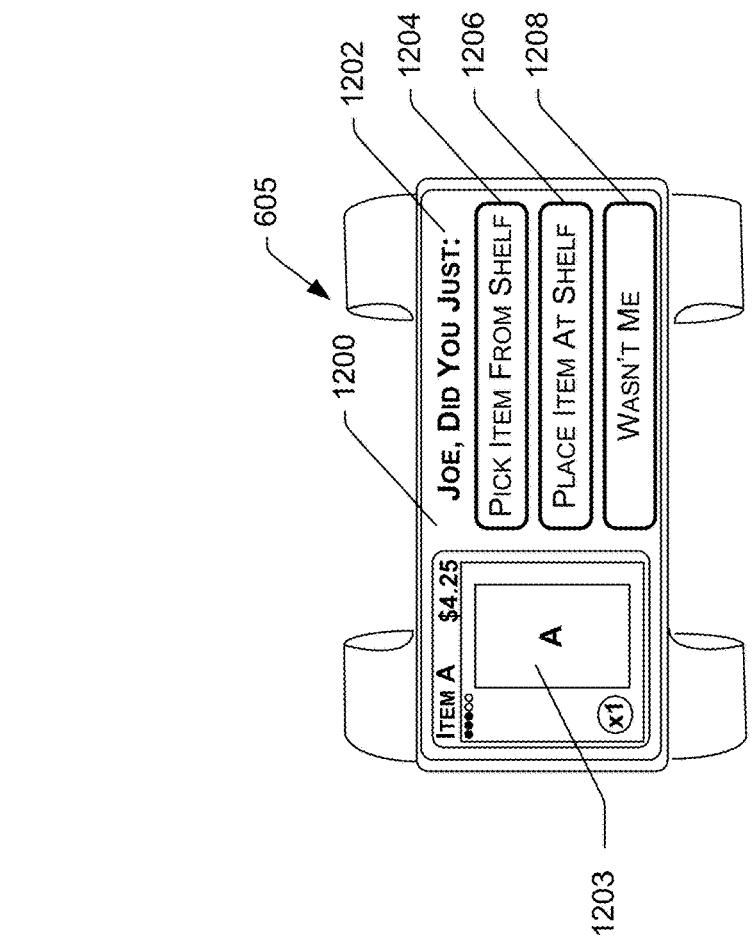

Turning to FIG. 12, illustrated is a user interface 1200 generated and sent for display to one or more potential users in response to a determination that the item determination confidence score is the only confidence score that exceeds a respective threshold. As illustrated, the user interface 1200 includes item information 1203 representative of the item determined to be involved in the event. Likewise, the user interface 1200 includes a request 1202 that the potential user confirm involvement in the event and if involved, the action performed with respect to the determined item. In this example, the request 1202 "Joe, Did You Just:" requests that the potential user (Joe) confirm whether they performed an action with respect to the determined item identified in the user interface 1200. The potential users may be one or more users identified by the user identification subroutine to potentially be involved in the event. Likewise, the actions may represent actions determined by the action determination subroutine as potentially performed in the event.

The potential user may confirm involvement and respond to both requests by selecting one or more of the alternative action 1204, 1206 controls. For example, the user may select a first alternative action 1204 "Pick Item From Shelf" to confirm that the potential user was involved in the event and performed the action of picking the determined item from an inventory location. Alternatively, the user may select a second alternative action 1206 "Place Item At Shelf" to confirm that the potential user was involved in the event and performed the action of placing the item at an inventory location. If the user was not involved in the event, the user may satisfy both requests by selecting the "Wasn't Me" control 1208 to confirm that the potential user was not involved in the event.

If the user interface is sent for presentation to multiple potential users, when a potential user confirms involvement in the event, the user interface 1200 may be removed form presentation from the other potential users.

In some implementations, if a request for confirmation is included in the user interface, such as the user interfaces discussed above and illustrated in FIGS. 7-12, a notification alert may also be sent to a device for presentation to the user. For example, the notification alert may be an audible, haptic and/or visual alert that is sent to alert the user that a request for confirmation of one or more event aspects is needed. The notification alert may be sent to the same and/or different devices than the device to which the user interface is sent. For example, the user interface may be sent to a portable device associated with the user. The notification alert may also be sent to the portable device and/or sent to another device (such as a shelf edge display) for presentation to the user.

Returning to FIG. 5B, if it is determined at decision block 528 that the item determination confidence score does not exceed the item determining threshold, an associate of the materials handling facility may be notified to assist in determining the user involved in the event, the action performed and the item, as in 532. For example, one or more images and/or video of the event may be provided to an associate for manual review and resolution. While this example describes providing information to an associate after completing each of the other decisions, in some implementations, the associate may be involved at any time. For example, if it is determined at decision block 504 that all three of the confidence scores do not exceed the threshold, information may be provided to the associate. Likewise, if an associate resolves any of the determinations that did not exceed the respective threshold, the information may not be presented to the user as a request for a response.

After all of the aspects of the event have been determined, one or more additional actions may be performed by the inventory management system. For example, if the event is determined to be a user placing an item into a tote, an item identifier representative of the determined item is added to an item identifier list associated with the user. If the event is determined to be a user picking an item from a tote, an item identifier representative of the picked item is removed from the item identifier list associated with the user. If the event is determined to be a user picking an item from an inventory location, item information representative of the determined item may be sent for presentation to the user. If the event is a user placing an item at an inventory location, any presented item information may be removed from presentation to the user. In other implementations, additional or fewer actions may be performed upon determination of each of the event aspects.

Figure 13:
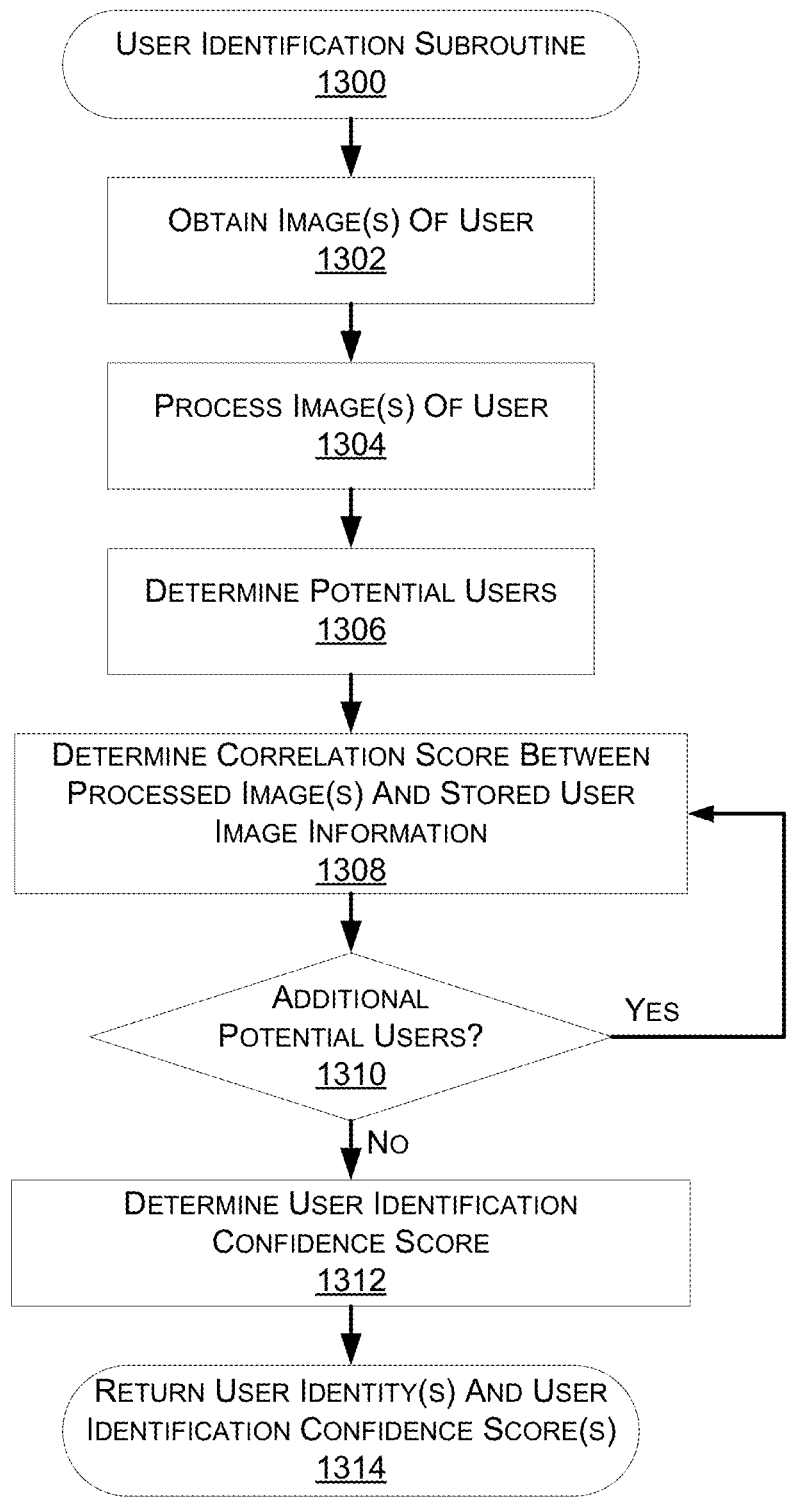
FIG. 13 is a flow diagram of an example user identification subroutine, according to one implementation.

FIG. 13 is a flow diagram of an example user identification subroutine 1300, according to one implementation. The example subroutine 1300 begins by obtaining one or more images of the user, as in 1302. Once obtained, the images are processed to determine feature outputs representative of the user included in the image, as in 1304. Various techniques may be used to process the images. For example, image capture and facial and/or feature recognition may be used to process the image and obtain processed user image information. In some implementations, distinguishing features of the user may be detected and included as part of the processed user image information. For example, as discussed above, if the user is wearing a bright colored shirt, has a tattoo, is wearing a hat, etc., any of those distinguishing features may be detected and included in the processed user image information. In addition to processing images, in some implementations other inputs may be considered. For example, the user may have an active or visual tag that is detected, the user may provide biometric information (e.g., finger print, retina scan), the user may provide a manual identification (e.g., user name and password), and/or other information that can be used to identify the user.

In addition to processing the images, one or more potential users are determined, as in 1306. For example, as discussed above, if the inventory management system identifies users when they first enter the materials handling facility and monitors the locations of the users while they move about the materials handling facility, potential users may be limited to only those within a defined distance of the occurrence of the event. For example, if the event occurs in an aisle, users located in that aisle may be determined to be potential users. Likewise, if the users are associated with one or more active tags, potential user may be limited to those for which an active tag reader near the location of the event can detect their active tags. In still another example, potential users may be limited based on the action involved in the event and/or the time between different events. For example, if a prior event included a pick of item A from an inventory location by User 1 and the next event includes a place of item A to the inventory location and the events are only a few moments apart, the example subroutine 1300 may consider the prior event to determine the potential users, in this case User 1. In still another example, if the action of an event relates to a pick from a tote or a place into a tote, the user associated with the tote may be considered when determining potential users. For each potential user, user information may be obtained from the user profile data store 1917 (FIG. 19), including the user pattern information determined when the user arrived at the materials handling facility and was first identified. User information may include stored user image information representative of the user, etc.

For each potential user, a correlation score between feature outputs and the stored user information obtained from the user profile data store is determined, as in 1308. For example, feature outputs may be compared to the stored user information and a correlation score determined that identifies how strongly (or how close) the feature outputs of the processed user image information correspond to the stored user information. After determining a correlation score for a potential user, a determination is made as to whether additional potential users remain for which a correlation score is to be determined, as in 1310. If additional potential users remain, the example subroutine returns to block 1308 and continues for each additional potential user.

However, if it is determined that additional potential users do not remain, a user identification confidence score is determined for the potential user having the highest correlation score, as in 1312. In some implementations, the user identification confidence score may be based on a ratio between the highest correlation scores of the potential users. For example, if the three highest correlation scores for potential users are 98% correlated for User 1, 22% correlated for User 2 and 20% correlated for user 3, the user identification confidence score will be high because there is a high correlation and a large ratio between each of the highest correlation score. In comparison, if the three highest correlation scores for potential users are 95% for User 1, 94% for User 2 and 93% for User 3, even though there is a high correlation, the user identification confidence score will be low because there is a small ratio between the highest correlation scores. In such an example, any of the three users (User 1, User 2, User 3) are likely to be the actual user involved in the event.

Upon determining the user identification confidence score, the example subroutine 1300 returns the user identifier corresponding to the highest correlation score and returns the determined user identification confidence score. In some implementations, the example subroutine may return multiple user identifiers, such as the three user identifiers having the three highest correlation scores.

Figure 14:
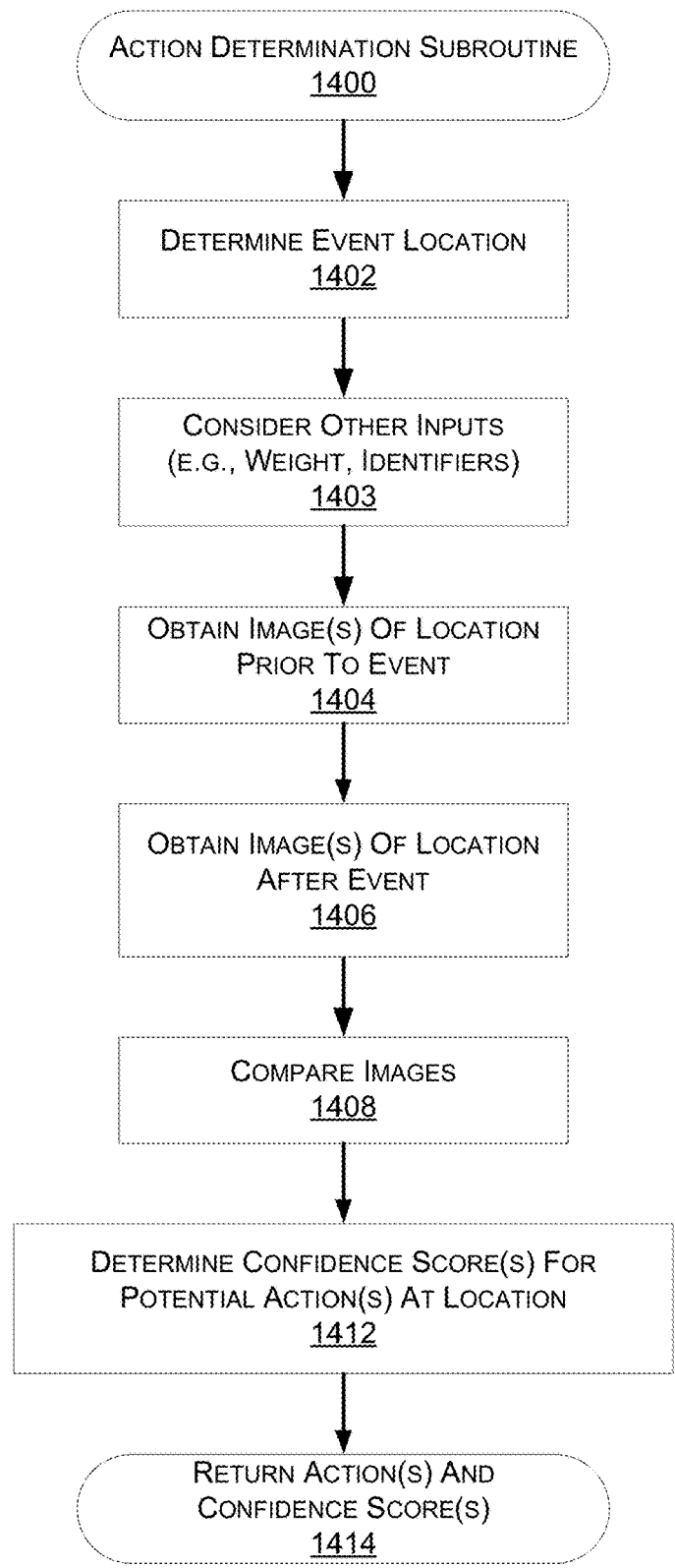
FIG. 14 is a flow diagram of an example action determination subroutine, according to one implementation.

FIG. 14 is a flow diagram of an example action determination subroutine, according to one implementation. The example subroutine 1400 begins by determining an event location, as in 1402. In the examples discussed herein, events either occur at an inventory location or at a tote. In other implementations, an event may occur at another location within the materials handling facility. The location of the event may be determined using a variety of techniques and/or inputs. For example, one or more input devices may detect the event and based on the location of those devices the location of the event can be determined. For example, if a scale or pressure sensor located at an inventory location detects a weight change, it may be determined that the event occurred at the inventory location where the weight change is detected. As another example, if an active tag of an item is detected within a tote, it may be determined that the event occurred at the location of the tote.

In addition to determining the location of the event, the one or more inputs may also be used as a factor in determining actions and/or confidence scores, as in 1403. For example, if a scale, pressure sensor and/or other weight determining element detected a change in a weight at the location, the change in the weight may also be considered in determining if the action was a pick or a place. If the weight at an inventory location is determined to have increased, the detected weight increase may be considered as a factor in determining a confidence score that an action of an item place was performed. Similarly, if a weight determining element at the location determined that the weight at the location decreased, the decrease in weight may be used as a factor in determining that the action was an item pick. Other inputs that may be considered in determining actions and/or confidence scores may include, but are not limited to, active tags (e.g., RFID), visual tags (e.g., barcodes, QR codes, bokodes), photodiodes, and/or auto-facing units. For example, in some implementations, an item may include an active and/or visual tag that may be detected when an event occurs. That detected tag may be utilized to assist in identifying the item, and/or action. Similarly, a user may possess an active and/or visual tag that may be detected and used to assist in identifying the user involved in the event. Photodiodes may be included on a shelf of an inventory location (and/or in a tote) and a change in light detected by the photodiodes may be used to assist in determining the item and/or action involved in the event. An auto facing unit may control the location of items in the unit such that when one item is removed another item is moved to the front of the unit to replace the removed item. When an item is picked or placed from the auto facing unit, the change in position of the items may be used to assist in determining the action and/or item involved in the event.

One or more images of the location prior to the event may also be obtained, as in 1404. In some implementations, images and/or video of inventory locations, totes, etc. may be periodically obtained and maintained by the inventory management system for a period of time. If an event is detected, images of the location where the event occurred may be obtained that represents the location before the event occurrence. Likewise, one or more images of the location of the event after the event occurrence may also be obtained, as in 1406. The set of images may then be processed and compared, as in 1408. For example, one or more image processing techniques, such as feature extraction, object recognition, edge detection etc., may be performed and the results of the processed images compared to identify a difference between the images. The comparison may be used to determine if an item was placed at the location or picked from the location. For example, if edge detection is performed on each image and the results compared, it can be determined if an item was added or removed from the location.

Based on the compared images and the other inputs, an action determination confidence score for each potential action at the determined location is determined, as in 1412. For example, if the location is determined to be a tote, an action determination confidence score for an action of an item pick from the tote is determined and an action determination confidence score for an action of an item place into the tote is determined. Finally, the action with the highest action determination confidence score and the determined action determination confidence score are returned, as in 1414. In some implementations, the action determine subroutine may return multiple actions as potentially corresponding to the event. When returning multiple potential actions, a probability score or likelihood may be returned with each determined action.

Figure 15:
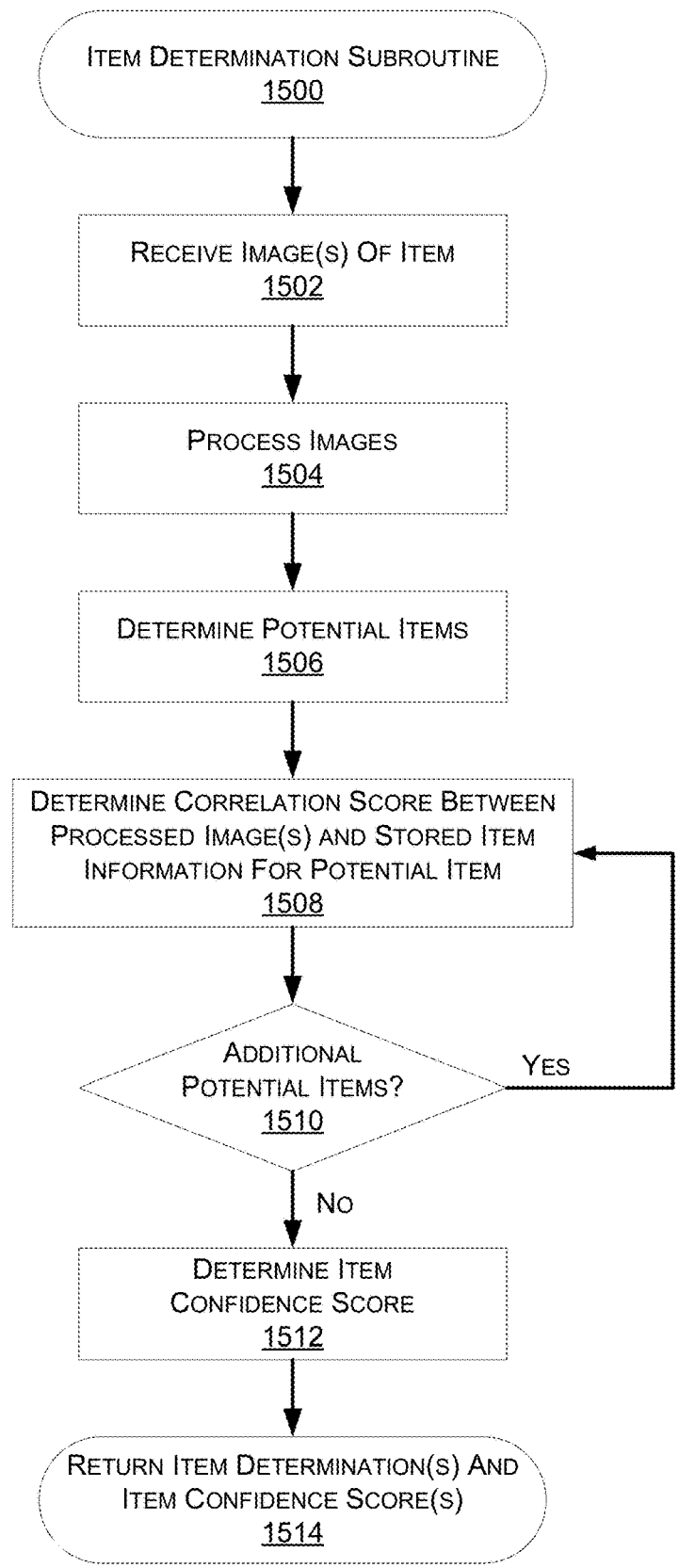
FIG. 15 is a flow diagram of an example item determination subroutine, according to one implementation.

FIG. 15 is a flow diagram of an example item determination subroutine, according to one implementation. The example subroutine 1500 begins upon receipt of one or more captured images of an item, as in 1502. A received image is processed to identify features of an item in the image, as in 1504. In some implementations, the image may be processed in grey-scale to identify features. Features of an item may be anything or combination of things that are identifiable for that item. For example, a feature may be the shape of the item, a color of the item, the label or logo on the item, the wording on the item, a symbol on the item, a character on the item, a word on the item, a number on the item, a texture of the item, a gradient of the item, a shape of the item, a reflectivity of the item, an edge of the item, and the like. For example, "Organic Dressing" identified on a label positioned on a tall slender bottle may be a feature. As will be appreciated, depending on the orientation of the item when the image is captured, different features may be identified. As such, each image of an item may include multiple, and/or different features. Processing of the image may also include determining an arrangement of the identified features. The arrangement may be a two dimensional relationship of the features with respect to each other as captured in the image. In other implementations, the arrangement of features may be a three-dimensional arrangement with respect to each other as captured in the image.

In addition to processing the image of the item, one or more potential items may be determined, as in 1506. For example, the inventory management system may maintain inventory location information for each item in the materials handling facility. Likewise, an item identifier list may be maintained by the inventory management system for each user, identifying the items included in the tote associated with the user. Based on the location of the event, the potential items may be limited to just those within a distance of the event location and/or just those that could potentially have been involved in the action determined for the event. For example, if the event is at an inventory location and the action is determined to be a pick of an item from the inventory location, the potential items may be reduced to only those items associated with the inventory location. As another example, if the action is a pick from a tote associated with a user, the potential items may be reduced to only those included in the tote associated with the user. In still another example, potential items may be limited based on the item involved in a prior event and/or the time between different events. For example, if a prior event included a pick of item A from an inventory location by User 1 and the next event includes a place of item A to the inventory location and the events are only a few moments apart, the example subroutine 1500 may consider the prior event to determine the potential items, in this case Item A.

Figure 19:
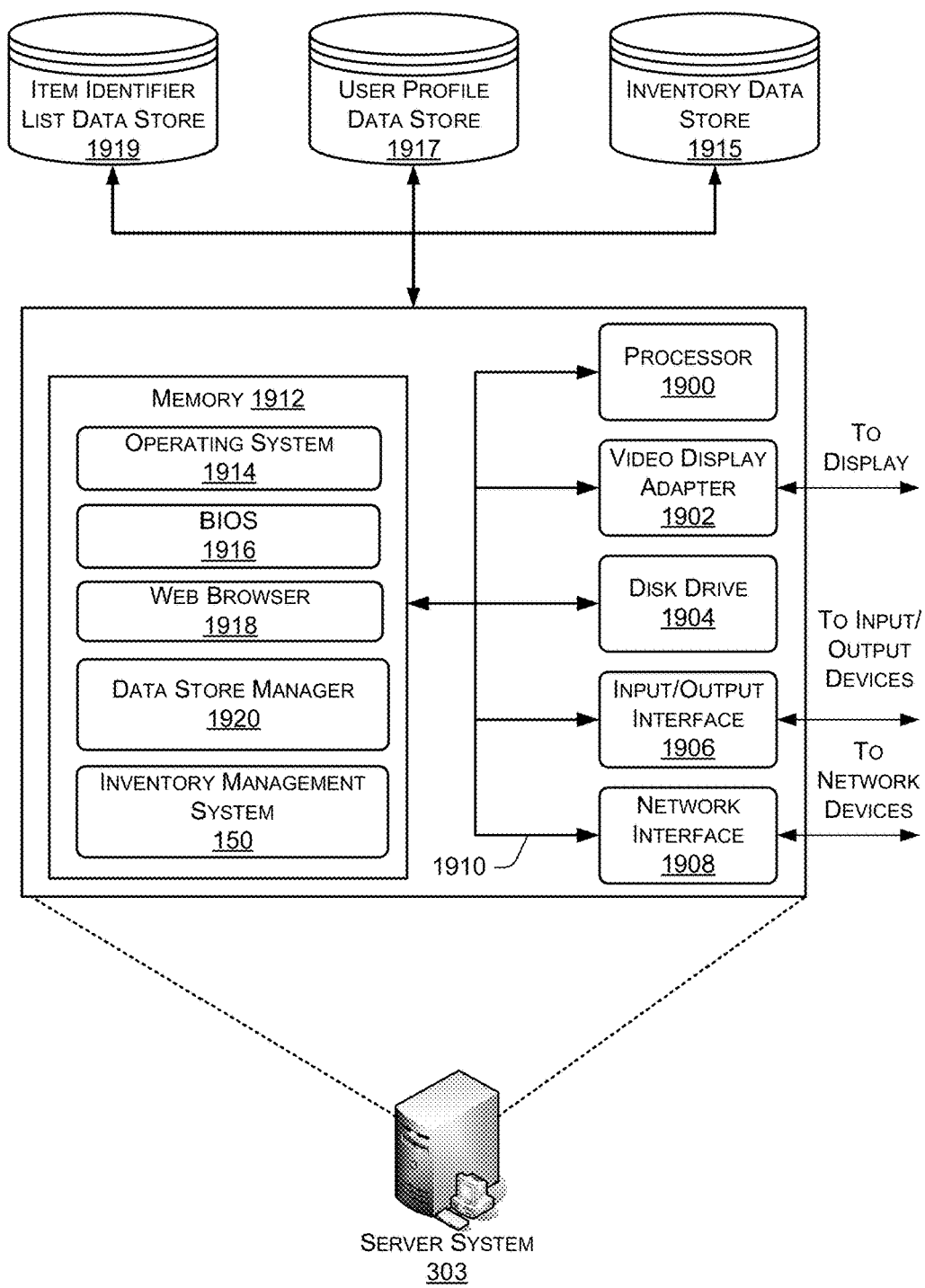
FIG. 19 is a block diagram of an illustrative implementation of a server system that may be used with various implementations.

For each potential item, item information may be obtained from the inventory data store 1915 (FIG. 19). Item information may include stored item image information representative of the item, etc. For example, as items are added to inventory, one or more images of the known items may be obtained, processed and item image information stored in the inventory data store 1915 and associated with the item.

For each potential item, a correlation score between processed item image information and the stored item image information obtained from the inventory data store is determined, as in 1508. For example, features of the processed item image information and/or the arrangement of those features may be compared to the stored item image information and a correlation score determined that identifies how strongly (or how close) the features of the processed item image information correspond to the stored item image information for the potential item. In some implementations additional or other inputs may also be considered and the correlation score for a potential item adjusted. For example, if a weight change is detected, an amount of the detected weight change may be compared to the weight associated with the potential item and the correlation score adjusted based on the similarity between the two weights. Likewise, if an identifier (e.g., active tag identifier, passive tag identifier) is detected, it may be determined if the identifier corresponds to the potential item and the correlation score increased or decreased accordingly. In some implementations, the additional and/or other inputs may be considered prior to processing an image. For example, an initial step in the item determination subroutine may include determining the item based on a weight change detected at the inventory location. Based on the inventory location and the weight change, in some implementations, the item may be identifiable without any image processing. In other implementations, the location, weight change and/or other inputs may be a factor in determining the confidence score(s).

After determining a correlation score for a potential item, a determination is made as to whether additional potential items remain for which a correlation score is to be determined, as in 1510. If additional potential items remain, the example subroutine returns to block 1508 and continues.

However, if it is determined that additional potential items do not remain, an item determination confidence score is determined for the potential item having the highest correlation score, as in 1512. In some implementations, the item determination confidence score may be based on a ratio between the highest correlation scores of the potential items. For example, if the three highest correlation scores for potential items are 98% correlated for Item A, 22% correlated for Item B and 20% correlated for Item C, the item determination confidence score will be high because there is a high correlation and a large ratio between each of the highest correlation scores. In comparison, if the three highest correlation scores for potential items are 95% for Item A, 94% for Item B and 93% for Item C, even though there is a high correlation the item determination confidence score will be low because there is a small ratio between the highest correlation scores. In such an example, any of the three items (Item A, Item B, Item C) are likely to be the actual item involved in the event.

Upon determining the item determination confidence score, the example subroutine 1500 returns the item identifier corresponding to the highest correlation score and returns the determined item determination confidence score. In some implementations, the example subroutine may return multiple item identifiers, such as the three item identifiers having the three highest correlation scores.

Figure 16:
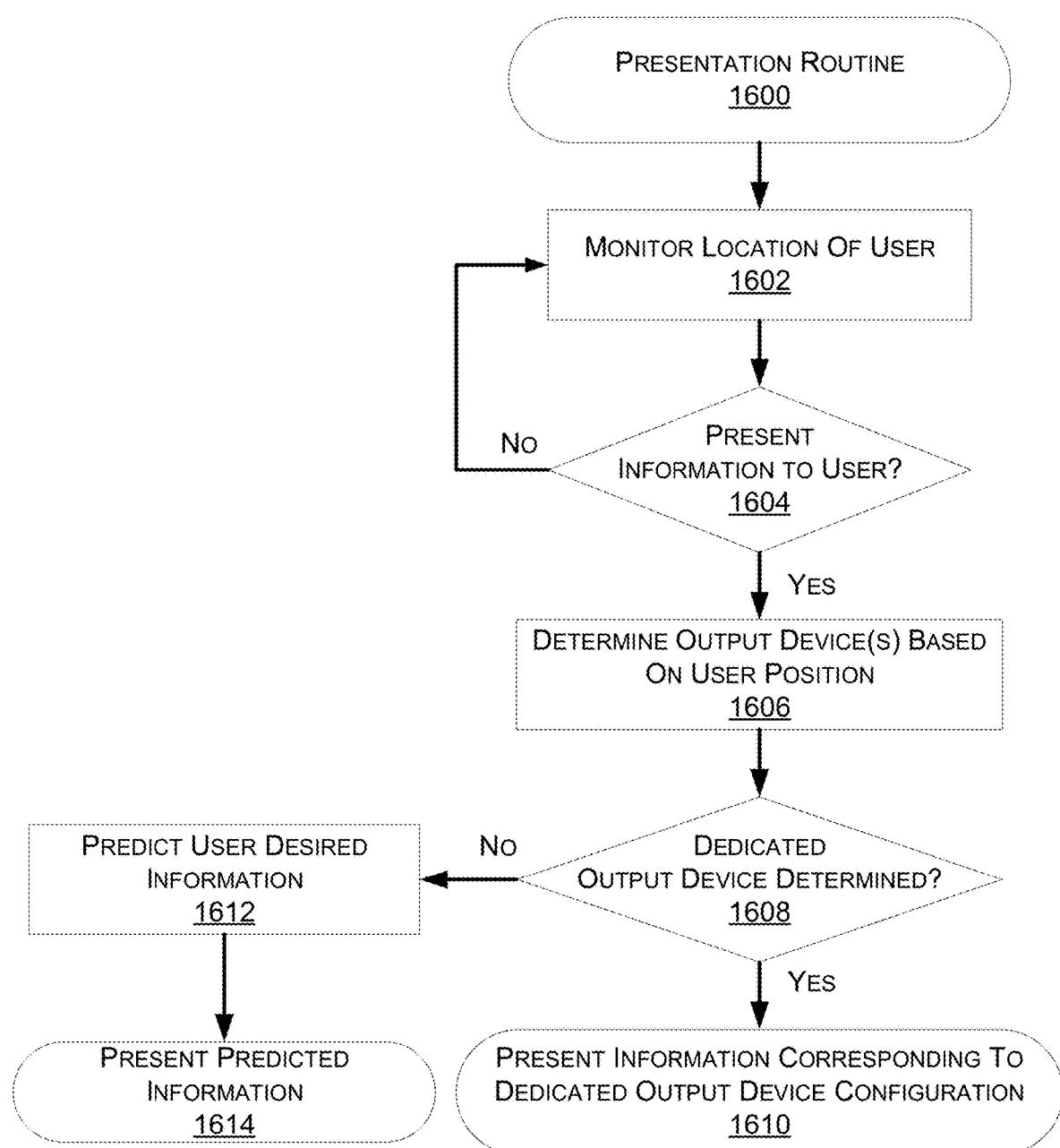
FIG. 16 is a flow diagram of an example routine for presenting information to a user, according to one implementation.

FIG. 16 is a flow diagram of an example routine 1600 for presenting information to a user, according to one implementation. The example routine 1600 begins by monitoring a location or position of a user within the materials handling facility, as in 1602. As discussed above, the position of a user within a materials handling facility may be continually monitored for use in identifying the user and/or events. For example, images of a user may be processed to determine the user's location within the materials handling facility. In other implementations, the location of one or more identifiers (e.g., tote identifier, active tag of the user, visual tag) associated with the user may be monitored as the user moves about the materials handling facility.

A determination is also made as to whether information is to be presented to the user, as in 1604. For example, if an event has been performed and one or more of the user interfaces discussed above with respect to FIGS. 6-12 are to be presented to the user, it may be determined that information is to be presented to the user. In other implementations, if it is determined that the user is positioned in front of or near an output device, it may be determined that information is to be presented to the user. For example, if the user is positioned in front of an inventory location that includes a shelf edge display, it may be determined that information (e.g., information about the items at the inventory location) is to be presented to the user via the shelf edge display. In another example, if the user is positioned near an output device that is dedicated for providing specific types of information (e.g., item comparison, item identifier list, recipes containing the item) it may be determined that information is to be presented to the user.

If it is determined that information is not to be presented, the example routine 1600 returns to block 1602 and continues. However, if it is determined that information is to be presented to the user, one or more output devices are determined based on the position of the user, as in 1606. User position may consider the orientation of the user's body and/or the user's head, the determined gaze direction of the user (i.e., where the user is looking), a gesture performed by the user, etc. For example, in some implementations, one or more images of the user may be captured and processed to determine the position of the user within the materials handling facility.

For each determined output device, a determination is made as to whether the output device is a dedicated output device for presenting specific types of information, as in 1608. For example, the display located on the tote associated with the user may be considered a dedicated output device configured to provide user specific information (e.g., item identifier list, recommendations, user specific advertisements). Likewise, some output devices within the materials handling facility may be configured as dedicated output devices. For example, shelf-edge displays maybe dedicated for providing information relating to the items located at the inventory location adjacent to the shelf-edge display. Likewise, some output devices may be dedicated for presenting information for item comparison. In still other examples, some output devices may be dedicated for presenting a user's item identifier list.

If it is determined that the output device is a dedicated output device, the information corresponding to the dedicated output device configuration is provided to the output device for presentation to the user, as in 1610. For example, if it is determined that the user is approaching or positioned near and output device dedicated for providing item identifier lists, the item identifier list associated with the user is provided for presentation to the user via the dedicated output device. However, if it is determined that the output device is not a dedicated output device, a determination is made predicting the information likely desired to be presented by the user, as in 1612. For example, if the user has just picked item A, paused and looked at item A before approaching the output device, it may be predicted that the user desires to be presented with information related to item A.

The predicted user desired information is then presented to the user, as in 1614. In some implementations, the presented information may also include a user actions menu that may be selected by the user. A user actions menu may be a list or other presentation of options available for selection by the user. For example, the user actions menu may provide the user with options as to what information they would like to have presented on the output device (e.g., help, item identifier list, recommendations, advertisements, etc.).

In some implementations, the user may pre-select the type of information to be provided on non-dedicated output devices, thereby effectively making them dedicated output devices for that user. For example, the user may specify that they desire to have recommendations presented on non-dedicated output devices. Such preferences may be associated with the user's profile and utilized to present information to the user.

Figure 17:
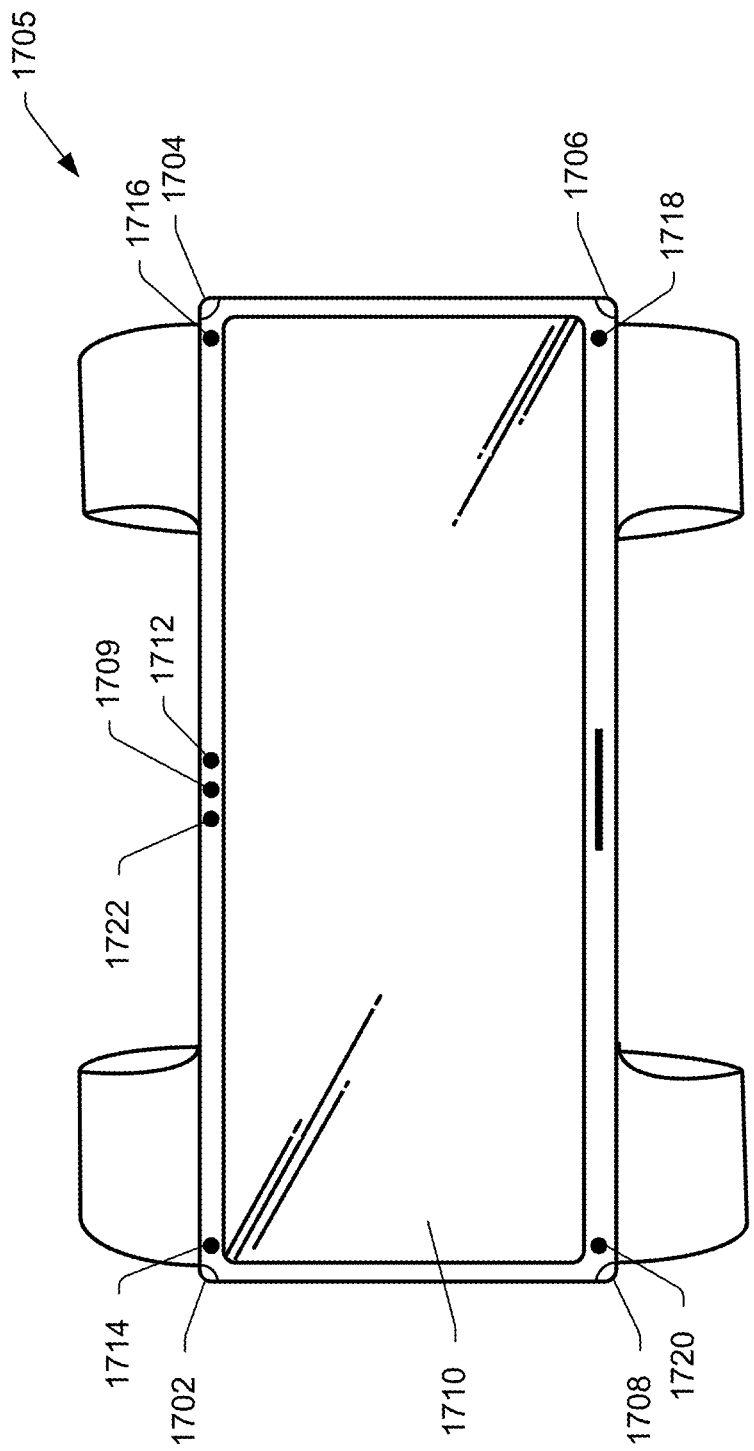
FIG. 17 illustrates an example device that can be used in accordance with various implementations.

FIG. 17 illustrates an example device 1705 including multiple components that can be used to capture various types of input and provide various outputs, in accordance with different implementations. It should be understood that, while the components of the example device are shown to be on a "front" of the device, there can be similar or alterative components on the sides or back of the device as well (or instead). Further, directions such as "top," "side," and "back" are used for purposes of explanation and are not intended to require specific orientations unless otherwise stated. It will also be appreciated that, while the form factor of the device 1705 is illustrated as a dual strap device that may be attached to the user's arm, tote, or other object, the structure and feature of the device 1705 and the components discussed with respect to FIG. 18, may be implemented in a variety of form factors.

In this example device 1705, there are four imaging elements (e.g., cameras) 1702, 1704, 1706, 1708 on the corners of the device, an illumination element 1709 on the front of the device and a touch-screen display 1710. The touch screen display 1710 may be formed using various display technologies (e.g., LCD, OLED, eInk, and so forth) in combination with a touch sensitive layer, such as capacitive touch sensor.

If the imaging elements have a sufficient wide-angle lens (e.g., a fish-eye lens), the imaging elements can have at least partially overlapping fields of view such that the imaging elements might be able to capture input from substantially any direction around the device. Examples of suitable imaging elements include hi-resolution RGB cameras and low-resolution RGB cameras. In this example, each imaging element also has an associated illumination element 1714, 1716, 1718, 1720 operable to direct light over a range of angles associated with a respective imaging element. Example illumination elements include, but are not limited to, light emitting diodes ("LED"), infrared illumination elements, visible light illumination elements, ultraviolet illumination elements, etc. Although the illumination elements are shown on the front of the device for convenience, it should be understood that the illumination elements can be on the corners of the device as well, and in at least some implementations can utilize the same wide-angle lenses to project light over a range of angles at least including the field of view of the respective imaging element. The illumination elements 1714-1720 are also operable to project illumination (e.g., white light or IR) to assist with image capture and/or identification of the device 1705 to the inventory management system 150. The device 1705 may also include a light sensor 1712 for use in determining when illumination might be needed. A projector 1722, such as a pico-projector, visual projector, structured light projector, etc., may also be included on the device 1705.

As discussed, an advantage of having a large number of imaging elements, illumination elements, touch-based displays, projectors and other such input components is to facilitate interaction with the user of the device 1705 and/or to communicate with the inventory management system 150. For example, if the user is in a crowded area such that detection of the user is difficult, the illumination element 1714 may emit a light or light pattern to aid in the location detection of the user by the inventory management system 150. In some implementations, the light or light pattern may not be perceivable by a human but detectable by one or more of the image captures devices within the materials handling facility. For example, the illumination element 1714 may emit a light pattern using infrared light. The infrared light may not be visible to humans but detectable by the image capture devices. For example, a series of images may be captured and analyzed to identify a pattern of light emitted by the device. The pattern of light identified from the series of images may be unique to and associated with the device so that the device can be identified.

In addition to imaging elements and touch-based input, as discussed below, the devices may also include a variety of other input components, such as an accelerometer, gyroscope, inertial sensor, pressure sensor, microphone, a barometer, a global positioning system (GPS), a compass, and the like.

Figure 18:
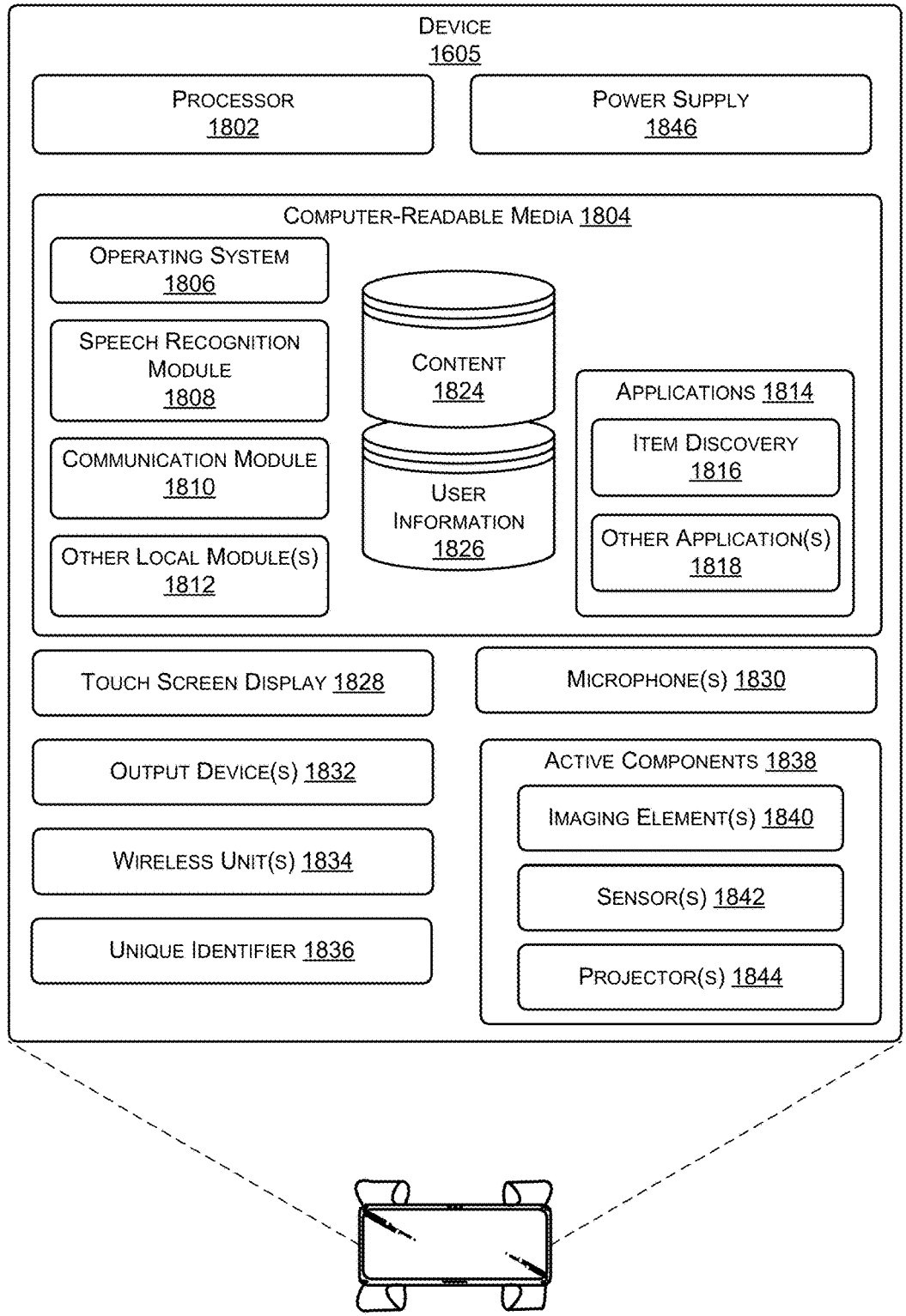
FIG. 18 illustrates an example configuration of components of a device, such as that illustrated in FIG. 17.

FIG. 18 illustrates example functional components of the example device 1705 of FIG. 17, in accordance with an implementation. The device 1705 includes one or more processors 1802 and computer-readable media 1804. The computer-readable media 1804 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology. The computer-readable media 1804 may be implemented as computer-readable storage media ("CRSM"), which may be any available physical media accessible by the processor(s) 1802 to execute instructions stored on the media 1804. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 1802.

Several modules such as instruction, data stores, and so forth may be stored within the computer-readable media 1804 and configured to execute on the processor(s) 1802. A few example functional modules are shown stored in the computer-readable media 1804, although the same functionality may alternatively be implemented in hardware, firmware, or as a system on a chip (SOC).

An operating system module 1806 may be configured to manage hardware and services within and coupled to the device 1705 for the benefit of other modules. A speech recognition module 1808 may employ any number of conventional speech recognition techniques such as use of natural language processing and extensive lexicons to interpret voice input. A communication module 1810, such as a wireless transceiver, facilitates communication, such as cellular communication, RF communication, Wi-Fi communication, Bluetooth communication, satellite-based communication, optical communication, and so forth. For example, the communication module 1810 may facilitate communication with the inventory management system 150 via the network 202 or over another wired and/or wireless communication path. Other local modules 1812 may also be present on the device, depending upon the implementation and configuration of the device. These modules may include more extensive speech recognition techniques, filters and echo cancellation modules, voice recognition modules, and so forth.

The device 1705 may also include a plurality of applications 1814 stored in the computer-readable media 1804 or otherwise accessible to the device 1705. In this implementation, the applications 1814 are item discovery 1816 and other applications 1818. However, the device 1705 may include any number or type of applications and is not limited to the specific example shown here. In one implementation, the device may be configured as a stand-alone component such that it can perform all of the features and functions discussed herein. For example, the device 1705 may maintain item information, capture images of items as they are picked by the user, detect events, process images to determine actions and/or items, and/or generate and provide user interfaces to the user. Likewise, the device may maintain the item identifier list, detect a place of an item into the tote associated with the user, etc.

Data stores may also be stored locally on the media 1804, including a content data store 1824 and one or more user information data stores 1826 of users that have interacted with and/or use the device 1705. The content data store 1824 may include various content that may be played or presented by the device, such as item information, alerts, music, books, magazines, videos and so forth. The user information data store 1826 may include user characteristics, preferences (e.g., how user interfaces are to be presented), usage history, purchase history, item identifier list, and other information specific to an individual user.

Generally, the device 1705 has a touch screen display 1828 and may include other input devices, such as a keypad, control buttons, etc. One or more microphones 1830 may be included to receive audio input. Output devices 1832 may include a display, an illumination element (e.g., LED), speaker, a vibrator to create haptic sensations, microphone(s) or the like. The device 1705 might further include a wireless unit 1834 coupled to an antenna to facilitate a wireless connection to one or more networks, such as the network 202. The wireless unit 1834 may implement one or more of various wireless technologies, such as Wi-Fi, Bluetooth, RF, and so on.

The device may also include an embedded unique identifier 1836. The unique identifier may be embedded into a memory 1804 of the device 1705 or otherwise stored and accessible by the device 1705.

The device 1705 may also be equipped with multiple active components 1838. Any number of components may be used. Representative components include imaging elements 1840, sensors 1842 and projectors 1844. The device 1705 may also include some form of power supply 1846, such as a battery, solar power, or other form of power supply for providing power to the device during operation.

While the example device 1705 is discussed herein as a single device, in other implementations, the device 1705 may be implemented as multiple devices. For example, one or more of the output components (e.g., microphone), imaging elements 1840 (e.g., camera), sensors 1842 (e.g., microphone, speaker) and/or projectors 1844 may be implemented in a first device, such as an earpiece, and other components, such as the touch screen display 1828, computer-readable media 1804, etc., may be implemented as a second device. In such implementations, the first device and the second device may communicate over a wired and/or wireless communication path (e.g., Bluetooth, NFC) and provide the features and functions of the device 1705, discussed herein. Generally, the device 1705 may be implemented as any form of computing device(s) that may be worn, placed upon and/or carried by a user that is capable of communicating with other computing devices, such as computing devices of inventory management system, and capable of presenting information to the user (e.g., audible, visual, tactile).

FIG. 19 is a pictorial diagram of an illustrative implementation of a server system, such as the server system 303 that may be used in the implementations described herein. The server system 303 may include a processor 1900, such as one or more redundant processors, a video display adapter 1902, a disk drive 1904, an input/output interface 1906, a network interface 1908, and a memory 1912. The processor 1900, the video display adapter 1902, the disk drive 1904, the input/output interface 1906, the network interface 1908, and the memory 1912 may be communicatively coupled to each other by a communication bus 1910.

The video display adapter 1902 provides display signals to a local display (not shown in FIG. 19) permitting an operator of the server system 303 to monitor and configure operation of the server system 303. The input/output interface 1906 likewise communicates with external input/output devices not shown in FIG. 19, such as a mouse, keyboard, scanner, or other input and output devices that can be operated by an operator of the server system 303. The network interface 1908 includes hardware, software, or any combination thereof, to communicate with other computing devices. For example, the network interface 1908 may be configured to provide communications between the server system 303 and other computing devices via the network 202, as shown in FIG. 2 and FIG. 3.

The memory 1912 generally comprises random access memory (RAM), read-only memory (ROM), flash memory, and/or other volatile or permanent memory. The memory 1912 is shown storing an operating system 1914 for controlling the operation of the server system 303. A binary input/output system (BIOS) 1916 for controlling the low-level operation of the server system 303 is also stored in the memory 1912.

The memory 1912 additionally stores program code and data for providing network services that allow the inventory management system 150 to identify users and/or items within the materials handling facility. Accordingly, the memory 1912 may store a browser application 1918. The browser application 1918 comprises computer executable instructions, that, when executed by the processor 1900 generate or otherwise obtain configurable markup documents such as Web pages. The browser application 1918 communicates with a data store manager application 1920 to facilitate data exchange between the inventory data store 1915, the user profile data store 1917 and/or the item identifier list data store 1919.

As used herein, the term "data store" refers to any device or combination of devices capable of storing, accessing and retrieving data, which may include any combination and number of data servers, databases, data storage devices and data storage media, in any standard, distributed or clustered environment. The server system 303 can include any appropriate hardware and software for integrating with the data stores 1915-1919 as needed to execute aspects of the inventory management system 150.

The data stores 1915-1919 can include several separate data tables, databases or other data storage mechanisms and media for storing data relating to a particular aspect. For example, the data stores 1915-1919 illustrated include mechanisms for maintaining inventory information (e.g., item locations, images of item when properly positioned, item features), user profile information, item lists associated with users, etc., which can be used to provide confirmations to a user that the inventory management system and properly identified an item and/or the action performed by the user.

It should be understood that there can be many other aspects that may be stored in the data stores 1915-1919. The data stores 1915-1919 are operable, through logic associated therewith, to receive instructions from the server system 303 and obtain, update or otherwise process data in response thereto.

The memory 1912 may also include the inventory management system 150, discussed above. The inventory management system 150 may be executable by the processor 1900 to implement one or more of the functions of the server system 303. In one implementation, the inventory management system 150 may represent instructions embodied in one or more software programs stored in the memory 1912. In another implementation, the inventory management system 150 can represent hardware, software instructions, or a combination thereof.

The server system 303, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction in FIG. 19 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more processors:
a memory storing program instructions that, when executed by the one or more processors, cause the one or more processors to at least:
determine a user identifier for a user when the user enters a materials handling facility;
subsequent to the user entering the materials handling facility and while the user is located in the materials handling facility:
receive, from an overhead camera positioned in the materials handling facility and configured to obtain an image of an inventory location, a first image of the inventory location;
process the image to determine an action of an item pick of an item from the inventory location at a first time;
determine a location of the user at the first time;
determine, based at least in part on the location of the user and the action, that the user was involved in the item pick; and
associate an item identifier corresponding to the item with the user identifier;
determine an output device operable to present information indicating the action of the item pick and indicating an identity of the item; and
send the information to the determined output device for presentation.

2. The system of claim 1, wherein the program instructions that when executed by the one or more processors to determine the user identifier further include instructions that, when executed by the one or more processors, further cause the one or more processors to at least:
determine the user identifier based at least in part on one or more of a biometric identification of the user, a processing of an image of the user to determine an identity of the user, an active tag associated with the user, a manual identification provided by the user, or a visual tag associated with the user.

3. The system of claim 2, wherein:
the program instructions that when executed by the one or more processors to determine the user identifier based at least in part on the biometric identification of the user, further include instructions that, when executed by the one or more processors, further cause the one or processor to at least determine the user identifier based at least in part on one or more of a fingerprint of a finger of the user or a retina scan;
the program instructions that when executed by the one or more processors to determine the user identifier based at least in part on the processing of the image further include instructions that, when executed by the one or more processors, further cause the one or more processors to at least process the image with at least one of a facial matching algorithm or a pattern matching algorithm to determine the identity of the user;
the program instructions that when executed by the one or more processors to determine the user identifier based at least in part on the active tag associated with the user further include instructions that, when executed by the one or more processors, further cause the one or more processors to at least detect, with an active tag reader, the active tag associated with the user;
the program instructions that when executed by the one or more processors to determine the user identifier based at least in part on the manual identification further include instructions that, when executed by the one or more processors, further cause the one or more processors to at least receive from the user a user name and a password; and
the program instructions that when executed by the one or more processors to determine the user identifier based at least in part on the visual tag associated with the user further include instructions that, when executed by the one or more processors, further cause the one or more processors to at least process an image of the user with at least one of an object matching algorithm or an edge detection algorithm to identify the visual tag.

4. The system of claim 1, wherein the program instructions that when executed by the one or more processors to cause the one or more processors to process the image to determine the action of the item pick further include instructions that, when executed by the one or more processors, further cause the one or more processors to at least:

receive an indication of a change in a weight at the inventory location; and determine, based at least in part on the change in the weight and the processing of the image, the action of the item pick of the item from the inventory location at the first time.

5. The system of claim 1, wherein the program instructions that when executed by the one or more processors further cause the one or more processors to at least:

determine, based at least in part on the inventory location, a plurality of candidate items;

process at least one of the first image or a second image of the item to determine a plurality of features of the item;

compare the plurality of features with stored item information corresponding to each of the plurality of candidate items to determine for each candidate item a correlation score indicative of a correlation between the plurality of features and the stored item information; and determine the item as an item of the plurality of items having a highest correlation score.

6. A computer-implemented method for determining event information, the method comprising:

detecting an occurrence of an event at a first time within a materials handling facility, wherein the event includes an action, an item, and a user;

in response to detecting the occurrence of the event:

processing first data from at least one input to determine the action involved in the event and an action confidence score that the action has been accurately determined, wherein the action is at least one of an item pick of the item from an inventory location, an item place of the item to the inventory location, an item pick from a tote, or an item place to the tote;

processing second data from at least one input to determine the item involved in the event and an item confidence score that the item has been properly determined; and processing third data from at least one input to determine the user involved in the event and a user confidence score that the user has been properly determined, wherein the user involved in the event performed the action;

determining that at least one of the action confidence score, the item confidence score, or the user confidence score does not exceed a threshold; and in response to determining that at least one of the action confidence score, the item confidence score, or the user confidence score does not exceed the threshold, sending, for presentation, event information indicating the action, the item, and the user and requesting a confirmation of at least one of an identity of the action, an identity of the item, or an identity of the user.

7. The computer-implemented method of claim 6, further comprising:

receiving the confirmation; and performing an action with respect to at least one of the action, the item, or the user.

8. The computer-implemented method of claim 6, wherein determining that at least one of the action confidence score, the item confidence score, or the user confidence score does not exceed a threshold, further includes determining that the action confidence score does not exceed the threshold, the item confidence score exceeds the threshold, and the user confidence score exceeds the threshold;

the computer-implemented method further comprising:

in response to determining that the action confidence score does not exceed the threshold, the item confidence score exceeds the threshold, and the user confidence score exceeds the threshold, sending, for presentation, event information that:

indicates that the item was properly determined;

indicates that the user was properly determined; and requests that the action corresponding to the item and performed by the user be confirmed.

9. The computer-implemented method of claim 6, wherein determining that at least one of the action confidence score, the item confidence score, or the user confidence score does not exceed a threshold, further includes determining that the action confidence score exceeds the threshold, the item confidence score does not exceed the threshold, and the user confidence score exceeds the threshold;

the computer-implemented method further comprising:

in response to determining that the action confidence score exceeds the threshold, the item confidence score does not exceed the threshold, and the user confidence score exceeds the threshold, sending, for presentation, event information that:

indicates that the action was properly determined;

indicates that the user was properly determined;

indicates a plurality of potential items that may have been involved in the event; and requests that the item corresponding to the event be confirmed.

10. The computer-implemented method of claim 9, wherein:

the event information indicates a plurality of candidate items determined to potentially be involved in the event; and the request includes a request that the item be confirmed by selection of one of the plurality of candidate items.

11. The computer-implemented method of claim 6, wherein determining that at least one of the action confidence score, the item confidence score, or the user confidence score does not exceed a threshold, further includes determining that the action confidence score exceeds the threshold, the item confidence score exceeds the threshold, and the user confidence score does not exceed the threshold;

the computer-implemented method further comprising:

in response to determining that the action confidence score exceeds the threshold, the item confidence score exceeds the threshold, and the user confidence score does not exceed the threshold, sending, for presentation, event information that:

indicates that the action was properly determined;

indicates that the item was properly determined; and requests confirmation of the user involved in the event.

12. The computer-implemented method of claim 6, wherein determining that at least one of the action confidence score, the item confidence score, or the user confidence score does not exceed a threshold, further includes determining that the action confidence score exceeds the threshold, the item confidence score does not exceed the threshold, and the user confidence score does not exceed the threshold;

the computer-implemented method further comprising:

in response to determining that the action confidence score exceeds the threshold, the item confidence score does not exceed the threshold, and the user confidence score does not exceed the threshold, sending, for presentation, event information that:

indicates that the action was properly determined;
requests confirmation of the item involved in the event; and
requests confirmation of the user involved in the event.

13. The computer-implemented method of claim 6, wherein determining that at least one of the action confidence score, the item confidence score, or the user confidence score does not exceed a threshold, further includes determining that the action confidence score does not exceed the threshold, the item confidence score exceeds the threshold, and the user confidence score does not exceed the threshold;

the computer-implemented method further comprising:
in response to determining that the action confidence score does not exceed the threshold, the item confidence score exceeds the threshold, and the user confidence score does not exceed the threshold, sending, for presentation, event information that:
indicates that the item was properly determined;
requests confirmation of the action; and
requests confirmation of the user involved in the event.

14. The computer-implemented method of claim 6, wherein determining that at least one of the action confidence score, the item confidence score, or the user confidence score does not exceed a threshold, further includes determining that the action confidence score does not exceed the threshold, the item confidence score does not exceed the threshold, and the user confidence score exceeds the threshold;

the computer-implemented method further comprising:
in response to determining that the action confidence score does not exceed the threshold, the item confidence score does not exceed the threshold, and the user confidence score exceeds the threshold, sending, for presentation, event information that:
indicates that the user was properly determined;
requests confirmation of the action involved in the event; and
requests confirmation of the item involved in the event.

15. The computer-implemented method of claim 6, further comprising:
determining an inventory location at which the event occurred;
determining a location of the user at the first time with respect to the inventory location; and
wherein the third data includes data indicating the location of the user at the first time with respect to the inventory location.

16. The computer-implemented method of claim 6, further comprising:
detecting a change in a weight at an inventory location at a first time; and
wherein:
detecting the occurrence of the event is based at least in part on the change in the weight;
the first data includes data indicating the change in the weight at the inventory location; and
the second data includes data indicating the change in the weight at the inventory location.

17. A system, comprising:
one or more processors; and
a memory storing program instructions that when executed by the one or more processors cause the one or more processors to at least:
determine an identity of a user as the user enters a materials handling facility;
subsequent to the user entering the materials handling facility and while the user is located in the materials handling facility, detect an occurrence of an event at a first time;
process first data from one or more inputs to determine a first location of the event;
process second data from the one or more inputs to determine a second location of the user at the first time;
determine, based at least in part on the first location and the second location that the user was involved in the event;
process third data from the one or more inputs to determine a plurality of candidate items involved in the event; and
send, for presentation to the user, event information that at least:
indicates the occurrence of the event; and
requests that the user confirm an identity of an item involved in the event.

18. The system of claim 17, wherein the program instructions that when executed by the one or more processors to cause the processors to send, for presentation to the user, the event information, further include instructions that, when executed by the one or more processors, further cause the one or more processors to at least:
send, for presentation to the user, event information that at least indicates at least two of the plurality of candidate items; and
requests that the user confirm an identity of the item through selection of the item from the at least two of the plurality of candidate items.

19. The system of claim 17, wherein:
the program instructions that when executed by the one or more processors further cause the one or more processors to at least:
process fourth data from the one or more inputs to determine an action involved in the event, wherein the action is at least one of a pick of the item from an inventory location, a place of the item at the inventory location, a pick of the item from a tote, or a place of the item to a tote; and
the program instructions that when executed by the one or more processors to cause the one or more processors to at least send, for presentation to the user, the event information, further include instructions that, when executed by the one or more processors further cause the one or more processors to at least send, for presentation to the user, the event information that at least indicates the action involved in the event.

20. The system of claim 19, wherein the program instructions that when executed by the one or more processors further cause the one or more processors to at least:
determine a confidence score corresponding to the action;
determine that the confidence score does not exceed a threshold; and
the program instructions that when executed by the one or more processors to cause the one or more processors to at least send, for presentation to the user, the event information, further include instructions that, when executed by the one or more processors further cause the one or more processors to at least send, for presentation to the user, the event information that at least requests that the user confirm the action.

\* \* \* \* \*